US010033896B2

(12) United States Patent
Masuda et al.

(10) Patent No.: US 10,033,896 B2
(45) Date of Patent: Jul. 24, 2018

(54) INFORMATION PROCESSING DEVICE WITH SUBSTITUTE REQUESTING PART FOR SLEEP MODE, INFORMATION PROCESSING SYSTEM, SERVER AND NON-TRANSITORY RECORDING MEDIUM

(71) Applicant: Konica Minolta, Inc., Chiyoda-ku, Tokyo (JP)

(72) Inventors: Satoshi Masuda, Neyagawa (JP); Kazuya Anezaki, Itami (JP); Hironori Harada, Amagasaki (JP); Atsushi Ohshima, Amagasaki (JP); Kenji Matsuhara, Kawanishi (JP); Daisuke Sakiyama, Kawanishi (JP); Takeshi Maekawa, Fukushima (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 0 days.

(21) Appl. No.: 15/370,850

(22) Filed: Dec. 6, 2016

(65) Prior Publication Data
US 2017/0171412 A1 Jun. 15, 2017

(30) Foreign Application Priority Data

Dec. 9, 2015 (JP) ................................. 2015/240151

(51) Int. Cl.
*H04N 1/00* (2006.01)
*H04N 1/327* (2006.01)

(52) U.S. Cl.
CPC ..... *H04N 1/00896* (2013.01); *H04N 1/00344* (2013.01); *H04N 1/00891* (2013.01);
(Continued)

(58) Field of Classification Search
CPC ........... H04N 1/00896; H04N 1/00904; H04N 1/00891; H04N 1/32795; H04N 1/32771;
(Continued)

(56) References Cited

U.S. PATENT DOCUMENTS 9,438,639 B2    9/2016 Satomi et al.
2012/0083200 A1* 4/2012 Koh ...................... G06F 1/3203
                                                    455/7

(Continued)

FOREIGN PATENT DOCUMENTS

JP     2011-59944 A    3/2011
JP     2012-100120 A   5/2012
(Continued)

OTHER PUBLICATIONS

Office Action dated May 2, 2017, by the Japanese Patent Office in corresponding Japanese Patent Application No. 2015-240151 and an English Translation of the Office Action. (8 pages).

(Continued)

*Primary Examiner* — Ming Hon
(74) *Attorney, Agent, or Firm* — Buchanan Ingersoll & Rooney PC

(57) ABSTRACT

An information processing device that communicates with a server on Internet over a local network, having: a session establishing part that establishes a session that enables a communication with said server over said local network; a periodic communicating part that establishes periodic communications at a predetermined time interval with said server to maintain said session; a power controller that stops a power supply to said periodic communicating part if a predetermined condition to enter sleep mode is met; and a substitute requesting part that requests another device installed on said local network to establish the periodic communication with said server that should be established (Continued)

by said periodic communicating part for said periodic communicating part when said power controller enables said information processing device to enter sleep mode.

17 Claims, 21 Drawing Sheets

(52) U.S. Cl.
CPC ..... *H04N 1/00904* (2013.01); *H04N 1/32771* (2013.01); *H04N 1/32795* (2013.01); *H04N 2201/0039* (2013.01); *H04N 2201/0094* (2013.01)

(58) Field of Classification Search
CPC ....... H04N 1/00344; H04N 2201/0039; H04N 2201/0094
See application file for complete search history.

(56) References Cited

U.S. PATENT DOCUMENTS

| | | | | |
|---|---|---|---|---|
| 2013/0097447 A1* | 4/2013 | Park | ...................... | G06F 1/3228 713/323 |
| 2014/0092417 A1* | 4/2014 | Kuroishi | ............ | H04N 1/00342 358/1.14 |
| 2014/0355052 A1 | 12/2014 | Mikashima | | |
| 2015/0128145 A1* | 5/2015 | Smyth | ................... | G06F 9/5094 718/104 |
| 2015/0170375 A1 | 6/2015 | Ito | | |
| 2015/0172493 A1* | 6/2015 | Anezaki | ............ | H04N 1/00891 358/1.13 |
| 2017/0353913 A1* | 12/2017 | Sun | ........................ | H04W 48/16 |

FOREIGN PATENT DOCUMENTS

| | | |
|---|---|---|
| JP | 2012-151788 A | 8/2012 |
| JP | 2014-215846 A | 11/2014 |
| JP | 2014-231175 A | 12/2014 |
| JP | 2015-115831 A | 6/2015 |
| JP | 2015-115837 A | 6/2015 |

OTHER PUBLICATIONS

Office Action dated Aug. 29, 2017, by the Japanese Patent Office in corresponding Japanese Patent Application No. 2015-240151, and an English Translation of the Office Action. (11 pages).

* cited by examiner

FIG. 4

SESSION MANAGEMENT INFORMATION 14

| 14a<br>SESSION ID | 14b<br>COMMUNICATION PARTNER INFORMATION | 14c<br>PERIODIC COMMUNICATION HISTORY |
|---|---|---|
| 1001 | MFP001 | 14:41:26 |
| 1002 | MFP002 | 14:50:23 |
| 1003 | MFP003 | 14:46:15 |

FIG. 9

SUBSTITUTE MANAGEMENT INFORMATION 30

| No. | SERVER INFORMATION | SUBSTITUTE DEVICE INFORMATION | REQUESTED DEVICE INFORMATION |
|---|---|---|---|
| 1 | SERVER001 | MFP003 | MFP001 |

30a, 30b, 30c

SUBSTITUTE MANAGEMENT INFORMATION 30

| No. | SERVER INFORMATION | SUBSTITUTE DEVICE INFORMATION | REQUESTED DEVICE INFORMATION |
|---|---|---|---|
| 1 | SERVER001 | MFP003 | MFP001 |
| 2 | SERVER001 | MFP003 | MFP002 |

FIG. 13

SUBSTITUTE MANAGEMENT INFORMATION  30

| No. | SERVER INFORMATION | SUBSTITUTE DEVICE INFORMATION | REQUESTED DEVICE INFORMATION |
|---|---|---|---|
| 1 | SERVER001 | MFP003 | MFP001 |
| 2 | SERVER001 | MFP003 | MFP002 |
| 3 | SERVER002 | MFP004 | MFP003 |

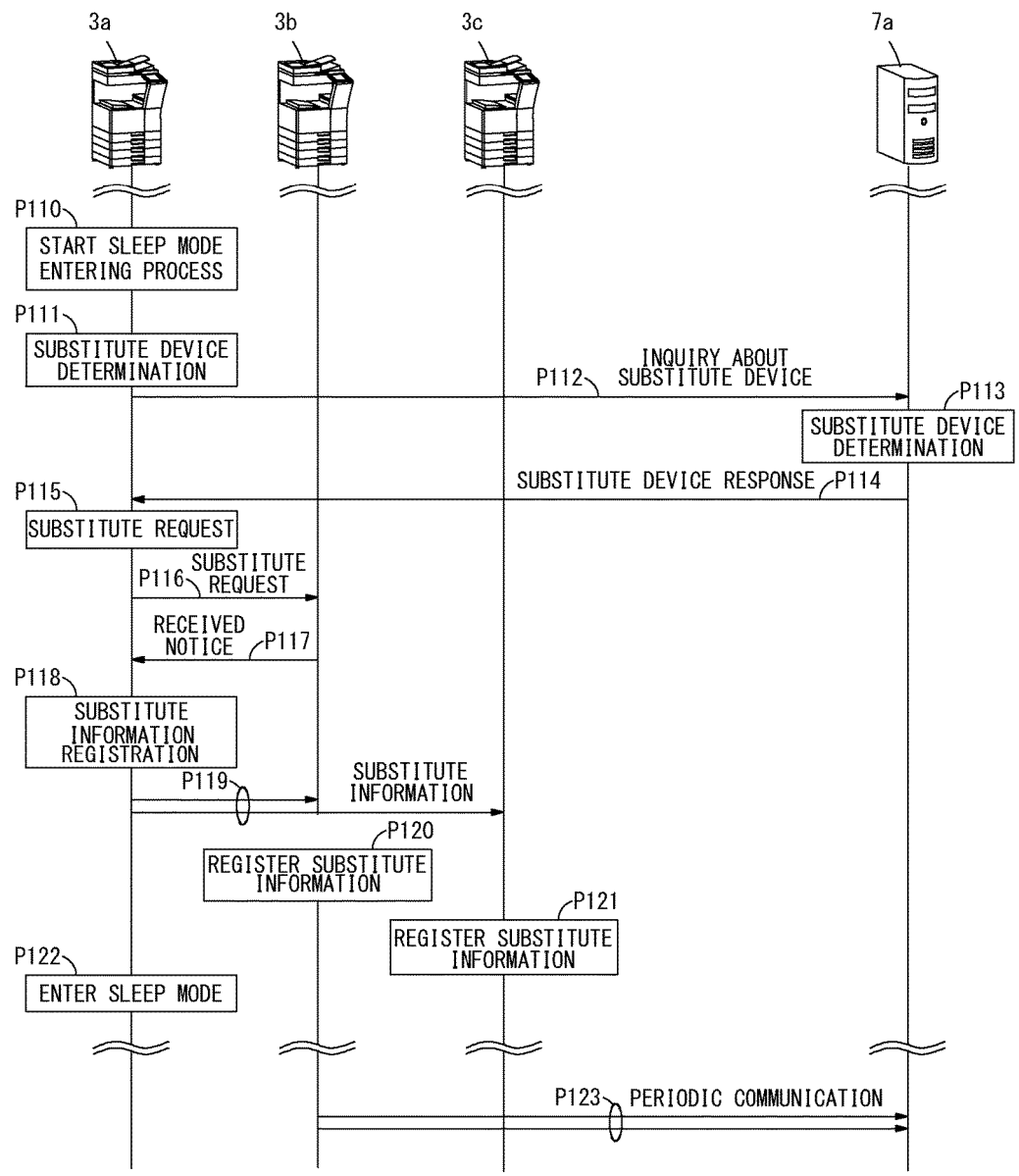

INFORMATION PROCESSING DEVICE WITH SUBSTITUTE REQUESTING PART FOR SLEEP MODE, INFORMATION PROCESSING SYSTEM, SERVER AND NON-TRANSITORY RECORDING MEDIUM

The present U.S. patent application claims a priority under the Paris Convention of Japanese patent application No. 2015-240151 filed on Dec. 9, 2015, the entirety of which is incorporated herein by references.

BACKGROUND OF THE INVENTION

Field of the Invention

The present invention relates to an information processing device, an information processing system, a server and a non-transitory recording medium. The present invention more specifically relates to a technique to enhance power-saving effect at the information processing device that maintains a connection with the server.

Description of the Background Art

Information processing devices such as MFPs (Multi-Function Peripherals) are capable of executing jobs by working together with a server installed on Internet. The information processing device accesses the server on Internet from a local environment such as an office, for example, thereby storing image data generated by a scan job or executing a job such as a print job by obtaining the image data stored in the server.

In the local environment where the information processing device is installed, it is general to build a firewall in a view of security. In order to send a job such as the print job from the server on Internet to the information processing device, it is required to develop an environment that enables the server to communicate with the information processing device over the firewall in the local environment.

It is conventionally introduced to install a dedicated gateway for communication with the server on Internet in the local environment to develop the above-described environment. This known technique is introduced for example in Japanese Patent Application Laid-Open No. JP 2015-115831 A. According to the known gateway, it establishes a constant connection using XMPP (eXtensible Messaging and Presence Protocol) with the server on Internet when it is powered on, for example, thereby establishing a path that allows the server to communicate with the information processing device in the local environment over the firewall. Hence, even when the information processing device is not accessing the server, the server on Internet communicates by a tunnel using a session established between the gateway and the server, thereby sending information such as the print job to the information processing device in the local environment.

The information processing device having a function of the above-described gateway function has been provided recently. The information processing device is configured to establish the session that enables a constant communication with the server on Internet and communicate with the server on a periodical basis at predetermined time intervals.

The information processing device has a sleep function aimed at electric power-saving. Even when the session with the server is established, the information processing device enters a sleep mode from normal mode if a predetermined condition is met. Once entering sleep mode, the information processing device stops a function to communicate with the server on the pediodical basis. The periodic communication with the server is not established, and the session between the information processing device and the server may be terminated. In order to avoid this, even when the information processing device enters sleep mode, it is required to put the power state of the information processing device back to an original normal mode at the predetermined time intervals to establish the periodic communications with the server.

It is assumed that the information processing device is often put back to normal mode from sleep mode for the periodic communication with the server. In this case, a duration that the information processing device is in sleep mode gets shortened and the full power saving effect cannot be obtained. Especially when multiple information processing devices are installed in the local environment, each information processing device is put back to normal mode from sleep mode individually for the separate periodic communication with the server, resulting in less efficient.

SUMMARY OF THE INVENTION

The present invention is intended to solve the above problems. Thus, the present invention is intended to provide an information processing device, an information processing system, a server and a non-transitory recording medium capable of obtaining an additional power saving effect compared to that in the past.

First, the present invention is directed to an information processing device that communicates with a server on Internet t over a local network.

To achieve at least one of the abovementioned objects, according to an aspect, the information processing device reflecting one aspect of the present invention comprises: a session establishing part that establishes a session that enables a communication with said server over said local network; a periodic communicating part that establishes periodic communications at a predetermined time interval with said server to maintain said session; a power controller that stops a power supply to said periodic communicating part if a predetermined condition to enter sleep mode is met; and a substitute requesting part that requests another device installed on said local network to establish the periodic communication with said server that should be established by said periodic communicating part for said periodic communicating part when said power controller enables said information processing device to enter sleep mode.

Second, the present invention is directed to an information processing system.

To achieve at least one of the abovementioned objects, according to an aspect, the information processing system reflecting one aspect of the present invention comprises: a first information processing device installed on a local network; a second information processing device installed on said local network; and a server on Internet capable of communicating with said first and said second information processing devices over said local network. The first information processing device includes: a first session managing part that establishes a first session that enables a communication with said server over said local network, and establishes periodic communications at a predetermined time interval with said server to maintain the first session; and a power controller that stops a power supply to said first session managing part if a predetermined condition to enter sleep mode is met. The second information processing device includes: a second session managing part that establishes a second session that enables the communication with said server over said local network, and establishes the periodic communications at the predetermined time interval with said server to maintain the second session. The first session managing part requests said second information processing device to establish the periodic communication with said server that should be established by said first session managing part for said first session managing part when said power controller enables said first information processing device to enter sleep mode. The second session managing part establishes the periodic communication with said server that should be established by said first information processing device for said first information processing device when a request to establish the periodic communication for said first information processing device is received from said first information processing device.

Third, the present invention is directed to a non-transitory recording medium storing a computer readable program to be executed by an information processing device that communicates with a server on Internet over a local network.

To achieve at least one of the abovementioned objects, according to an aspect, the non-transitory recording medium reflecting one aspect of the present invention stores the computer readable program to be executed by an information processing device that communicates with a server on an internet over a local network. Execution of the computer readable program by said information processing device causing said information processing device to execute the steps of: (1) establishing a session with said server over said local network; (2) establishing periodic communications with a server at a predetermined time interval to maintain said session; (3) enabling a power state to enter sleep mode if a predetermined condition to enter sleep mode is met; and (4) requesting another device on said local network to establish the periodic communication with said server that should be established in said step (2) when the power state is enabled to enter sleep mode in said step (3).

Fourth, the present invention is directed to a non-transitory recording medium storing a computer readable program to be executed by a server connected to Internet and capable of communicating with multiple information processing devices.

To achieve at least one of the abovementioned objects, according to an aspect, the non-transitory recording medium reflecting one aspect of the present invention stores the computer readable program to be executed by a server connected to an internet and capable of communicating with multiple information processing devices. Execution of the computer readable program by said server causing said server to execute the steps of: (1) establishing a separate session with each of said multiple information processing devices, and maintaining said session by receiving a periodic communication from each of said information processing devices; and (2) determining a substitute device that establishes the periodic communication for one of said multiple information processing devices from among the other multiple information processing devices except for said one of said multiple information processing devices when an inquiry about the device that establishes the periodic communication for said one of said multiple information processing devices is received from said one of said multiple information processing devices.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein:

FIG. 4 shows an example of session management information;

FIG. 9 shows an example of substitute management information in the information processing device;

FIG. 13 shows an example of the substitute management information updated at the information processing device;

FIG. 21 is a flow diagram explaining an exemplary procedure of an operation when the information processing device of the second preferred embodiment enters sleep mode.

DESCRIPTION OF THE PRESENT PREFERRED EMBODIMENTS

Hereinafter, embodiments of the present invention will be described with reference to the drawings. However, the scope of the invention is not limited to the illustrated examples.

(First Preferred Embodiment)

Figure 1:
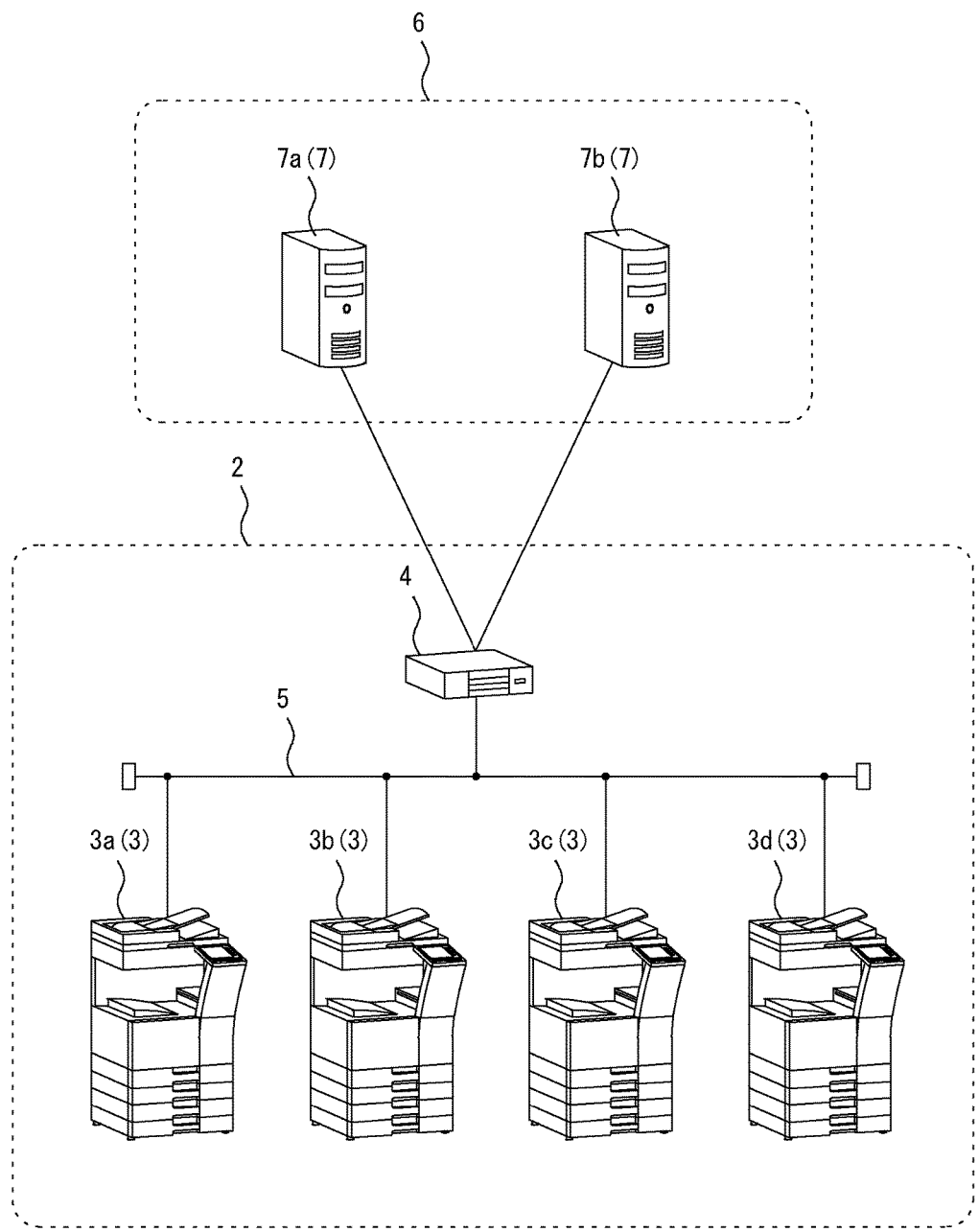
FIG. 1 shows an exemplary configuration of an information processing system.

FIG. 1 shows an exemplary configuration of an information processing system 1 of the first preferred embodiment of the present invention. The information processing system 1 comprises multiple information processing devices 3a, 3b, 3c and 3d and a communication relay device 4 in a local environment 2. Multiple servers 7a and 7b are installed on Internet 6. A local network 5 such as a LAN (Local Area Network) is established in the local environment 2. The multiple information processing devices 3a, 3b, 3c and 3d are connected to the local network 5, and the communication relay device 4 is also connected to the local network 5. The local network 5 has an access to Internet 6 via the communication relay device 4. In descriptions below, the multiple information processing devices 3a, 3b, 3c and 3d are just stated as the information processing device 3 when they are not individually distinguished. The multiple servers 7a and 7b are just stated as the server 7 when they are not individually distinguished. In the example of FIG. 1, four information processing devices 3a, 3b, 3c and 3d are installed in the local environment 2. However, this is given not for limitation. The number of the information processing devices 3 is not always four, and it should be at least more than two. In the example of FIG. 1, two servers 7a and 7d are installed on Internet 6. However, this is given not for limitation. The number of the servers should not always be two.

The information processing device 3 constructed by a device such as one of MFPs, for instance, is capable of executing a variety of jobs including a scan job and a print job. The information processing device 3 is also capable of executing the job by working together with the server 7 by communicating with the server 7 on Internet 6 over the local network 5 via the communication relay device 4. The information processing device 3 has a sleep function aimed at a power-saving. When a certain condition such as maintaining a state that no user uses the information processing device 3 more than a predetermined period of time is met, for example, the sleep function is activated and the power mode of the information processing device 3 enters power-saving mode from normal mode.

The communication relay device 4 is constructed by a device such as a network router, for instance. The communication relay device 4 connects the local network 5 to Internet 6. The communication relay device 4 has a firewall function. The communication relay device 4 blocks the access to the local network 5 from Internet t 6 besides the communication using a session established between the information processing device 3 and the server 7.

The server 7 provides a cloud service over Internet 6. The services provided by the server 7 include a variety of services such as a storage service to store a various types of data including document data and/or image data, an edit service to edit data such as a document and/or an image and an update service to update a firmware of the information processing device 3, for example.

An application to execute the job by working together with the server 7 is installed in advanced on the information processing device 3 on the above-described information processing system 1. After the application is run on the information processing device 3, the information processing device 3 establishes the session that enables a constant communication using a XMPP with the server 7 on Internet 6. To be more specific, the information processing device 3 sends a connection request to an address of the server 7 on Internet 6 over the local network 5 via the communication relay device 4. The server 7 establishes a new session using the XMPP and establishes the connection that enables the communication with the information processing device 3 based on the connection request from the information processing device 3. The server 7 assigns a new session ID to the session established with the information processing device 3, and manages the session with the assigned session ID. The session ID is identification information for the server 7 to identify each of the multiple sessions. The server 7 notifies the information processing device 3 of the session ID, then communicates with the information processing device 3 with the session ID.

After establishing the session with the information processing device 3, the server 7 communicates with the information processing device 3 on the periodical basis, thereby maintaining the session successfully. The session between the information processing device 3 and the server 7 is maintained constantly so that the server 7 is capable of sending the print job to the information processing device 3 installed in the local network 5 using the session. It is assumed that a user operates a terminal device such as a smartphone or a tablet terminal to access the server 7, specifies data stored in the server 7 to print, and designates the information processing device 3 connected to local network 5 as a destination of the print job. In this case, the print job is sent from the server 7 to the information processing device 3. After receiving the print job from the server 7, the information processing device 3 executes the print job, thereby producing a printed output based on the data specified by the user. The server 7 is capable of sending a job other than the print job to the information processing device 3 using the connection with the information processing device 3. Also, the server 7 sends the firmware to the information processing device 3, thereby enabling an update of the firmware of the information processing device 3.

If the periodic communication with the information processing device 3 is stopped for more than a predetermined period of time, the server 7 terminates the session with the information processing device 3. Thus, the server 7 is not allowed to send data such as the job and/or the firmware to the information processing device 3 on the local network 5.

After the session between the information processing device 3 and the server 7 is established, the communication relay device 4 obtains the session ID sent and received between the information processing device 3 and the server 7, and manages the connection between the information processing device 3 and the server 7 with the session ID. The communication between the information processing device 3 and the server 7 is established on a periodical basis so that the communication relay device 4 maintains the connection between the information processing device 3 and the server 7. If the periodic communication between the information processing device 3 and the server 7 stops for more than the predetermined period of time, the communication relay device 4 determines it is a timeout, and discards the session ID. The communication relay device 4 then cancels the connection between the information processing device 3 and the server 7. In this case, the session between the information processing device 3 and the server 7 is terminated by the communication relay device 4, and the server 7 is no longer capable of sending the data such as the job and/or the firmware to the information processing device 3. In order to avoid this, a time interval between the periodic communications between the information processing device 3 and the server 7 is set shorter than a timeout period until the session is terminated by the communication relay device 4 in the first preferred embodiment. The time interval between the periodic communications established by the information processing device 3 with the server 7a and the time interval between the periodic communications with the server 7b do not have to be the same with each other. After establishing the session with the server 7 by running the application, the information processing device 3 communicates with the server 7 at the predetermined time interval on the periodical basis to maintain the session effectively.

Even when the session with the server 7 is established, the predetermined condition may be met. In such a case, the information processing device 3 activates the sleep function to enter sleep mode from normal mode. After the sleep function in the information processing device 3 activates, the function to establish the periodic communication with the server 7 stops. Even while the sleep function is activating, the information processing device 3 measures the time interval to establish the periodic communication with the server 7. When it is the time to establish the periodic communication with the server 7, the information processing device 3 deactivates the sleep function and is back to normal mode to start establishing the periodic communication with the server 7.

Figure 2:
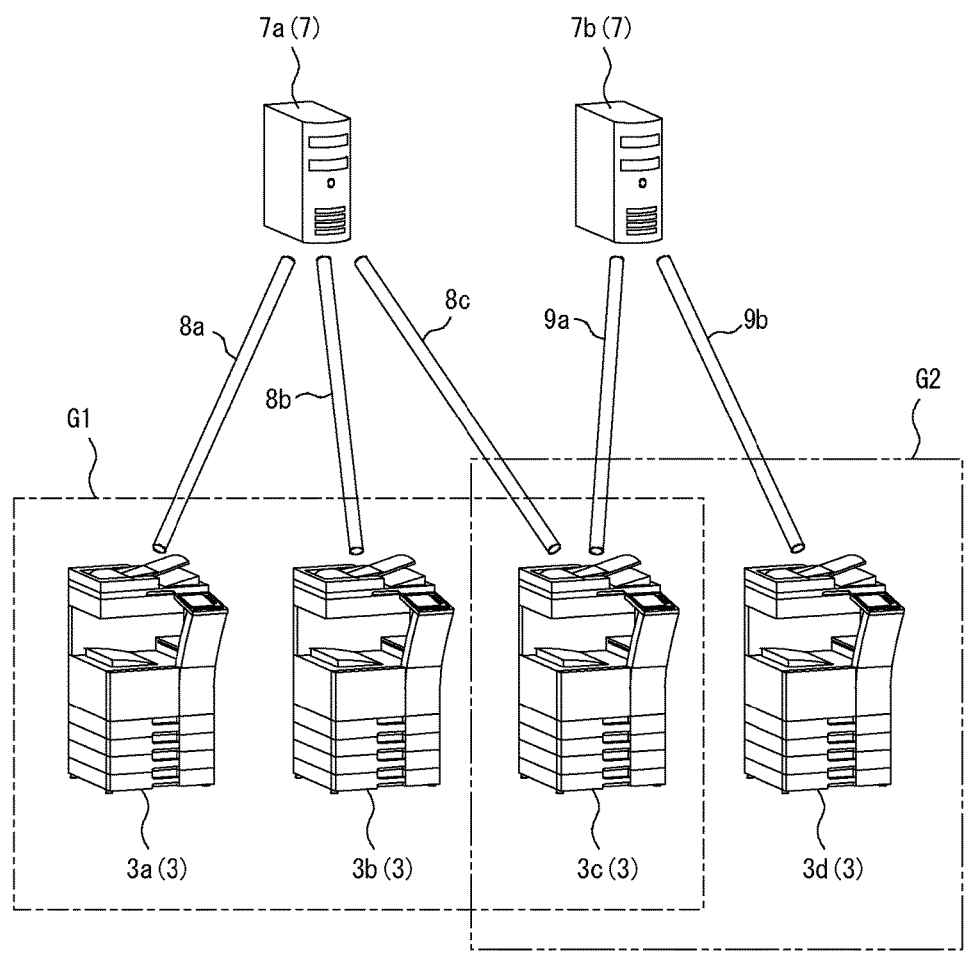
FIG. 2 shows an example of a state where a session between an information processing device and a server is established.

FIG. 2 shows an example of a state where the session between the information processing device 3 and the server 7 is established according to the first preferred embodiment. In the first preferred embodiment, applications to work together with the server 7a is installed on the information processing devices 3a and 3b, and an application to work together with the server 7b is installed on the information processing device 3d. Applications to work together with the respective servers 7a and 7b are installed on the information processing device 3c. As a result, each of the information processing devices 3a, 3b and 3c of the first preferred embodiment establishes separate session 8a, 8b and 8c with the server 7a, and each of the information processing devices 3c and 3d establishes separate session 9a and 9b with the server 7b as shown in FIG. 2. More specifically, a first group G1 is made up of three information processing devices 3a, 3b and 3c of the multiple information processing devices 3a, 3b, 3c and 3d and a second group G2 is made up of two information processing devices 3c and 3d. The information processing devices communicate with the first server 7a with the sessions 8a, 8b and 8c are in the first group G1, and the information processing devices communicate with the second server 7b with the sessions 9a and 9b are in the second group G2. The information processing device 3c establishes the session 8c with the first server 7a, and also the session 9a with the second server 7b. The information processing device 3c is, therefore, in the first group G1 and the second group G2.

The information processing devices 3a and 3b establish the periodic communications with the first server 7a at respective time intervals stated at the first server 7a to maintain the sessions 8a and 8b with the first server 7a. The information processing device 3c establishes the periodic communications with the first server 7a at the time interval stated at the first server 7a to maintain the session 8c with the first server 7a and the periodic communications with the second server 7b at the time interval stated at the second server 7b to maintain the session 9a with the second server 7b. The information processing device 3d establishes the periodic communications with the second server 7b at the time interval stated at the second server 7b to maintain the session 9b with the second server 7b.

It is assumed that any of the multiple information processing devices enters sleep mode as the aforementioned sessions 8a, 8b, 8c, 9a and 9b are established. In this case, the information processing device requests another information processing device 3 to establish the periodic communication for it. Another information processing device 3 is configured to establish the periodic communication for the information processing device 3 that requested in response to the request. The detail of the above-described information processing system 1 is described next.

Figure 3:
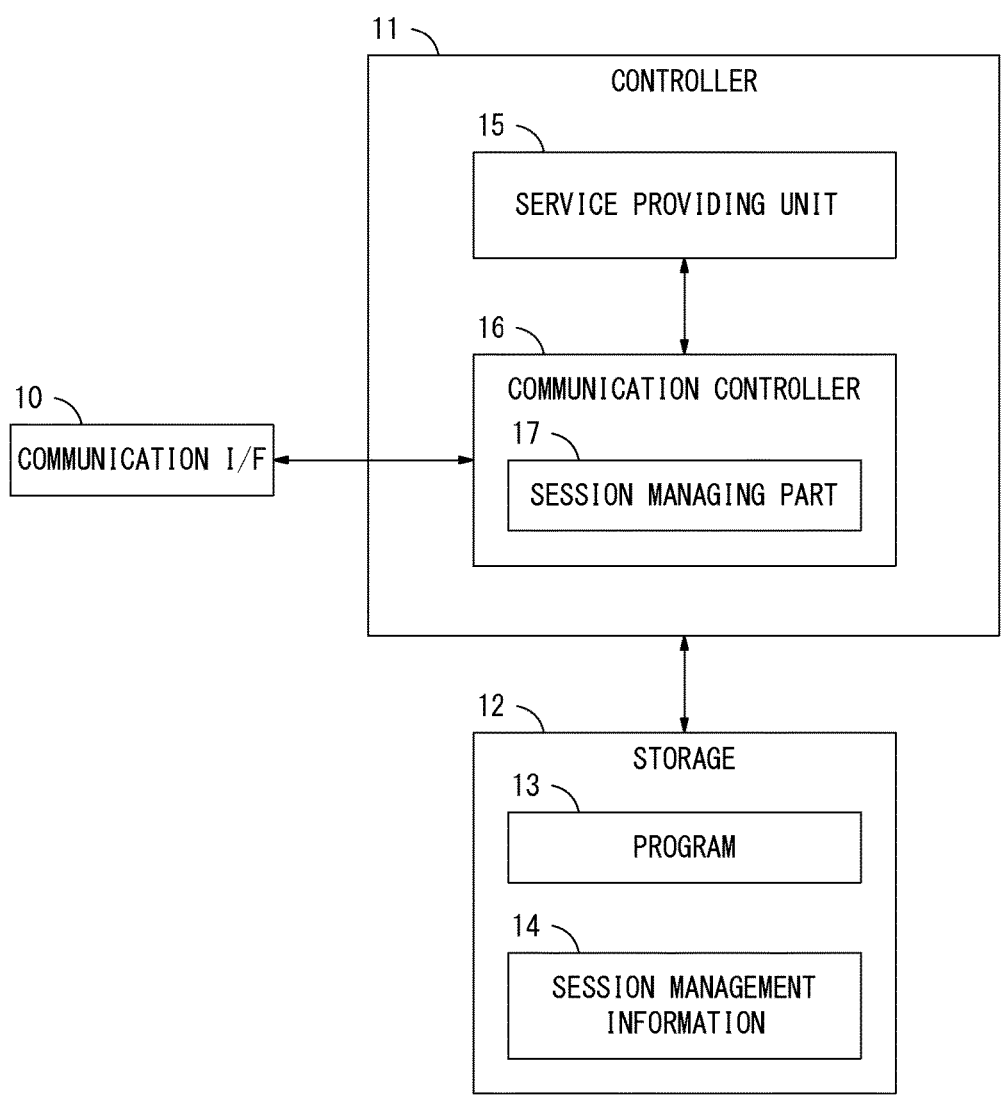
FIG. 3 is a block diagram showing an example of a hardware structure and that of a functional structure of the server of the first preferred embodiment.

FIG. 3 is a block diagram showing an example of a hardware structure and that of a functional structure of the server 7. As illustrated in FIG. 3, the server 7 includes a communication interface 10, a controller 11 and a storage 12 as its hardware structure. The communication interface 10 connects the server 7 to the network and enables the server 7 to communicate with the information processing device 3 over Internet 6. The controller 11 includes a CPU and a memory. The controller 11 manages the session using the XMPP with the information processing device 3 and performs a process to provide the variety of cloud services. The storage 12 is formed from a nonvolatile storage device formed from a device such as a hard disk drive (HDD), for example. A program 13 executed by the CPU of the controller 11 is installed in advance in the storage 12, for instance. Session management information 14 is also stored in the storage 12. The storage 12 includes a data storage area to provide the cloud services, which is not shown in FIG. 3. A variety of data including document data, image data and/or the firmware of the information processing device 3 is stored in the data storage area.

The CPU executes the program 13 so that the controller 11 serves as a service providing unit 15 and a communication controller 16. The communication controller 16 establishes the session with the information processing device 3 using the XMPP via the communication interface 10, and communicates with the information processing device 3 using the session. The communication controller 16 includes a session managing part 17 described later. The service providing unit 15 provides the cloud service via the communication controller 16. The service providing unit 15, for example, reads data such as the document data and/or the image data in the storage 12 and generates a print job. The service providing unit 15 then outputs the print job to the communication controller 16. The communication controller 16 establishes a tunnel communication using the session established with the information processing device 3 to send the print job received from the service providing unit 15 to the information processing device 3. As a result, the server 7 is allowed to enable the information processing device 3 to execute the print job. When receiving the document data and/or the image data from the information processing device 3, the communication controller 16 outputs the received data to the service providing unit 15. The service providing unit 15 then stores the data in the storage 12.

The session managing part 17 establishes the session using the XMPP with the information processing device 3 in response to the connection request from the information processing device 3. After establishing the new session with the information processing device 3, the session managing part 17 registers the session with the session management information 14 and manages.

FIG. 4 shows an example of the session management information 14. As shown in FIG. 4, a session ID 14a, communication partner information 14b and periodic communication history 14c are associated with each other and registered as the session management information 14, for example. The session ID of the session established with the information processing device 3 is stated as the session ID 14a, and the communication partner information 14b is to identify a communication partner of the session. Information of date and time of the previous periodic communication with the information processing device 3, for instance, is stated as the periodic communication history 14c. If the job is sent and received between the server 7 and the information processing device 3 after the previous periodic communication, the date and time when the job is sent and received is stated as the periodic communication history 14*c*.

The session managing part 17 refers to the periodic communication history 14*c* in the session management information 14, and establishes the periodic communication using the session ID with the information processing device 3 before an elapse of a predetermined period of time from the previous periodic communication. The session managing part 17 then updates the periodic communication history 14*c* corresponding to the session ID, and maintains the session corresponding to the session ID effectively. The session managing part 17 may not establish the periodic communication using the session ID with the information processing device 3 before the elapse of the predetermined period of time from the previous periodic communication. In this case, the session managing part 17 deletes the information corresponding to the session ID in the session management information 14. The session between the server 7 and the information processing device 3 is then terminated.

It is assumed that the periodic communication for another device is received from another device which is registered as the communication partner information 14*b* and is the information processing device 3 different from the communication partner with which the communication with the session ID should be established and registered with the session management information 14. In this case, the session managing part 17 receives the periodic communication as a valid one. The session managing part 17 updates the periodic communication history 14*c* corresponding to the session ID assigned to the periodic communication established by another information processing device 3 substitute for the original communication partner, and maintains the session corresponding to the session ID effectively.

As described above, after the server 7 establishes the session with the information processing device 3, the information processing device 3 that uses the session establishes the periodic communications at the predetermined time intervals so that the session is maintained effectively. Also, even when another information processing device 3 which does not use the session establishes the periodic communications at the predetermined time intervals substitute for the information processing device 3 that uses the session, the session is maintained successfully. The information processing device 3 that does not establish the session may establish the periodic communication substitute for the information processing device 3 that establishes the session. In this case, the server 7 does not receive such periodic communication. In the example of FIG. 2, for example, the server 7*a* only receives the periodic communication from the information processing device 3*a*, 3*b* or 3*c*. The server 7*a* does not receive the periodic communication from the information processing device 3*d* which sends the periodic communication substitute for another information processing device 3.

Figure 5:
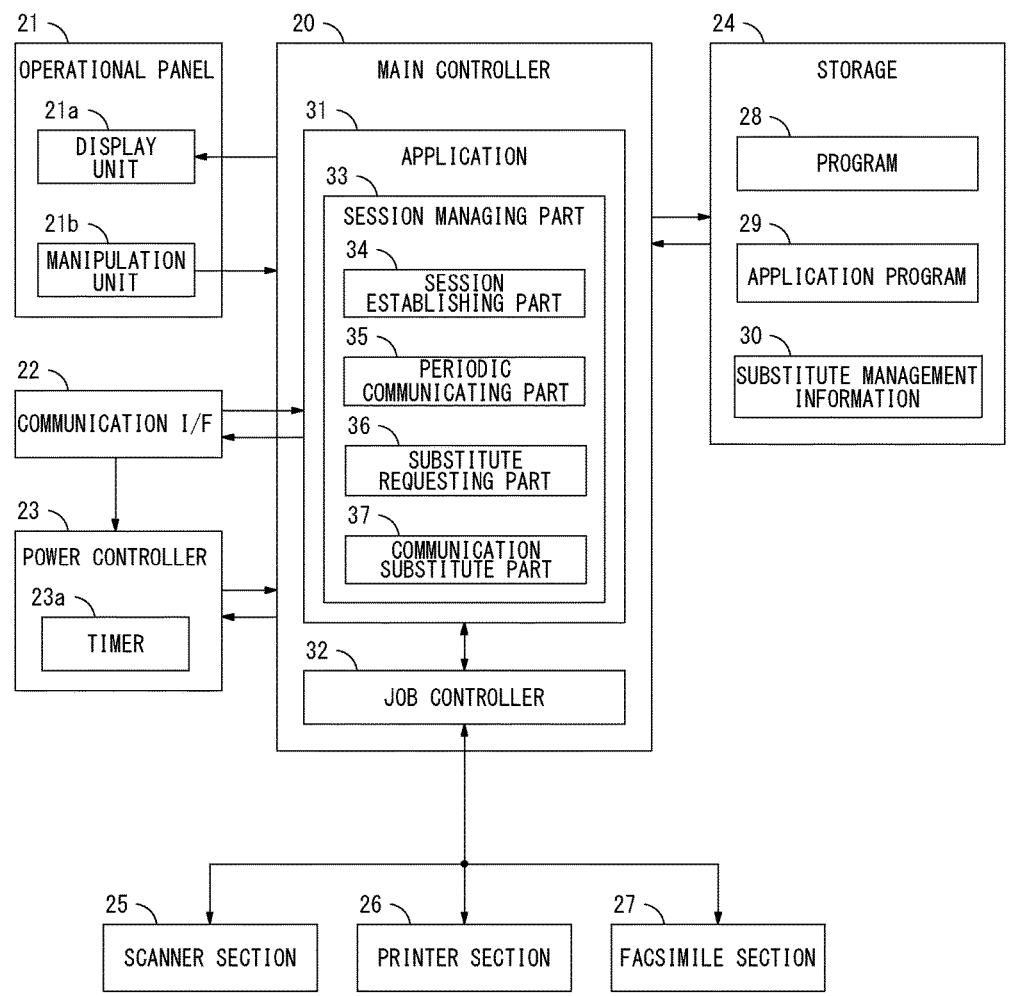
FIG. 5 is a block diagram showing an example of a hardware structure and that of a functional structure of the information processing device.

FIG. 5 is a block diagram showing an example of a hardware structure and that of a functional structure of the information processing device 3. The information processing device 3 includes a main controller 20, an operational panel 21, a communication interface 22, a power controller 23, a storage 24, a scanner section 25, a printer section 26 and a facsimile section 27 as its hardware structure. The main controller 20 controls operations of each processing part and includes a CPU and a memory which are not shown in FIG. 5. The operational panel 21 is a user interface for a user to operate the information processing device 3. The operational panel 21 includes a display unit 21*a* on which various types of information is displayed to the user and a manipulation unit 21*b* receives inputs by the user. The communication interface 22 is to connect the information processing device 3 to the local network 5 for communication.

The scanner section 25 optically reads a document placed by the user and generates image data. The printer section 26 forms a toner image based on the image data, transfers the toner image to a printing medium such as a printing sheet, and produces a printed output. The facsimile section 27 sends and receives facsimile data via a phone line which is not shown in FIG. 5.

The storage 24 is formed from a nonvolatile storage device formed from a device such as a hard disk drive (HDD), for example. A variety of programs executed by the CPU of the main controller 20 are stored in the storage 24. A program 28 to be an operating system of the information processing device 3 and an application program 29 to perform a process worked together with the server 7 on Internet 6 are installed in advance in the storage 24. Substitute management information 30 is also stored in the storage 24.

The power controller 23 controls the sleep function in the information processing device 3. The power controller 23 controls the two steps of power modes of the information processing device 3, for instance, including a normal mode and a sleep mode. The normal mode is a normal power mode that supplies the power to the above-described each processing part. The normal mode enables an execution of the job at the information processing device 3. The sleep mode is the power-saving state. The information processing device 3 in normal mode enters sleep mode when it is not being used for a predetermined period of time. The sleep mode stops the power supply to the display unit 21*a* of the operational panel 21, the scanner section 25, the printer section 26, the facsimile section 27 and the storage 24. Once the information processing device 3 is in sleep mode due to the control by the power controller 23, the main controller 20 stops its function.

Even in sleep mode, the power supply to the manipulation unit 21*b* of the operational panel 21 and the communication interface 22 is continued. When the user operates the operational panel 21 as the information processing device 3 is in sleep mode, or the communication interface 22 receives data such as the job, the operational panel 21 or the communication interface 22 sends a return order to the power controller 23. The power controller 23 then is allowed to put the information processing device 3 back to normal mode from sleep mode. The communication interface 22 has a function to analyze information received over the local network 5. When the information broadcast in the local network 5 is received during sleep mode, the communication interface 22 does not send the return order to the power controller 23. Thus, the power controller 23 is allowed to continue sleep mode even when the broadcast information is received by the communication interface 22 during sleep mode.

The power controller 23 includes a timer 23*a*. The timer 23*a* measures a time when to enable the information processing device 3 in normal mode to enter sleep mode. The timer 23*a* also measures a time when to enable the information processing device 3 in sleep mode to back to normal mode for the periodic communication with the server 7. The timer 23*a* becomes operative when the process relating to the job is not performed at the main controller 20, for example, and starts measuring the time until enabling the information processing device 3 in normal mode to enter sleep mode. After the predetermined period of time is measured by the timer 23*a*, the power controller 23 notifies the main controller 20 that the information processing device 3 enters sleep mode, then enables the information processing device 3 in normal mode to enter sleep mode. It is assumed that the instruction on a wake-up timing to normal mode for the periodic communication with the server 7 is given by the main controller 20 after notifying the main controller 20 that the information processing device 3 enters sleep mode. In this case, the power controller 23 puts the timer 23a into operation again when the information processing device 3 enters sleep mode to start measuring the time until putting the information processing device 3 back to normal mode. When the timer 23a detects that it is the wake-up timing, the power controller 23 powers the information processing device 3 back on and puts the information processing device 3 back to normal mode. If the instruction on the wake-up timing is not given by the main controller 20, the power controller 23 does not put the timer 23a into operation during sleep mode, resulting in increased duration of sleep mode.

After the information processing device 3 is powered on, the CPU of the main controller 20 automatically reads and executes the program 28 in the storage 24. The main controller 20 then serves as a job controller 32. The job controller 32 controls overall execution of the job at the information processing device 3. The job controller 32 receives an input of the job via the operational panel 21 or the communication interface 22 and puts the scanner section 25, the printer section 26 or the facsimile section 27 into operation, thereby controlling the execution of the received job.

After the program 28 is run, the CPU of the main controller 20 automatically or in response to a user instruction reads and executes the application program 29 in the storage 24. The main controller 20 thus puts an application 31 into operation. The application 31 is run to perform the process worked together with the server 7 on Internet 6. The application 31 has a function to mediate the receipt and transmission of data such as the job data between the job controller 32 and the server 7. The application 31 includes a session managing part 33 to communicate with the server 7. The session managing part 33 manages the session established with the server 7. As the application 31 is running on the main controller 20, the session managing part 33 is configured to manage the session effectively. The session managing part 33 includes a session establishing part 34, a periodic communicating part 35, a substitute requesting part 36 and a communication substitute part 37.

The session establishing part 34 sends the connection request to the server 7 as the application 31 starts to run, and establishes the session that enables the constant communication with the server 7. The session establishing part 34 obtains the session ID from the server 7. The session managing part 33 establishes communication with the session ID for communicating with the server 7 once the session is established with the server 7. When receiving the job from the server 7 which is sent using the session, the session managing part 33 outputs the received job to the job controller 32. The job received from the server 7 is then executed at the information processing device 3.

It is assumed that the job data is not sent or received to and from the server 7. In this case, the periodic communicating part 35 becomes operative to communicate with the server 7 on the periodical basis at the certain time intervals, thereby maintaining the session with the server 7. The time interval between the periodic communications is set with the application 31 as the time shorter than that required until the session is terminated at the server 7. The periodic communicating part 35 includes an internal timer. The periodic communicating part 35 activates the internal timer when the session managing part 33 is not sending or receiving the job to and from the server 7. The periodic communicating part 35 sends an arrive signal with the session ID to the server 7 and establishes the periodic communication every time the internal time measures the time set in advance with the application 31. Also, when the information processing device 3 is back to normal mode from sleep mode, the periodic communicating part 35 sends the arrive signal with the session ID to the server 7, thereby establishing the periodic communication. As a result, even when the application 31 does not send or receive the job to and from the server 7 for a long time, the session with the server 7 is maintained effectively.

The substitute requesting part 36 becomes operative when the power controller 23 enables the information processing device 3 to enter sleep mode. The substitute requesting part 36 requests another information processing device 3 installed on the local network 5 to establish the periodic communication with the server 7 for the periodic communicating part 35. Another information processing device 3 that has been establishing the session with the same server 7 is requested by the substitute requesting part 36 to serve as the substitute for the periodic communicating part 35 to establish the periodic communication. The substitute requesting part 36 makes an inquiry at the server 7 to confirm another information processing device 3 that has been establishing the session with the same server 7. Multiple other information processing devices 3 may be confirmed. If there are multiple other information processing devices 3 that have been establishing the sessions with the same server 7, the substitute requesting part 36 selects one of the other information processing devices 3 as a substitute device, and requests the substitute device to establish the periodic communication for the periodic communicating part 35. As a result, after the information processing device 3 enters sleep mode, it is allowed to enable another information processing device 3 to establish the periodic communication with the server 7 to maintain the session for it. A way to select one of the other information processing devices 3 as the substitute device is described later.

If one of the other information processing devices 3 cannot be selected as the substitute device, the substitute requesting part 36 notifies the power controller 23 of the wake-up timing, and does not requests another information processing device 3 to serve as the substitute for the information processing device 3. In this case, after entering sleep mode, the information processing device 3 is powered back on and put back to normal mode at the certain time intervals for the periodic communications with the server 7.

After requesting another information processing device 3 to establish the periodic communication for the information processing device 3, the substitute requesting part 36 generates substitute information and registers the generated substitute information with the substitute management information 30. The substitute requesting part 36 also sends the substitute information to another information processing device 3. The server 7, the substitute device and the requested device (the information processing device 3 that requested another information processing device 3 to serve as the substitute for it) are associated with each other and registered as the substitute information. In response to receiving the substitute information from another information processing device 3, the session managing part 33 updates the substitute management information 30 based on the substitute information. The information about substitute relations to establish the periodic communication can be shared in the local network 5.

In response to receiving the request for the periodic communication from another information processing device 3, the communication substitute part 37 establishes the periodic communication with the server 7 for another information processing device 3. The communication substitute part 37 sends the arrive signal with the session ID of the session established between another information processing device 3 and the server 7, thereby establishing the periodic communication for another information processing device 3 which was supposed to be established by another information processing device 3. The communication substitute part 37 sometimes establishes the periodic communications for more than one information processing device 3. The communication substitute part 37 may serve as the substitute for two information processing devices 3 to establish the periodic communications, for example. In this case, the communication substitute part 37 sends the separate arrive signal with each session ID to the server 7, thereby establishing the periodic communications for the other information processing devices 3 which were supposed to be established by the other information processing devices 3. When the periodic communicating part 35 establishes the periodic communication with the server 7, the communication substitute part 37 sends the arrive signal with the session ID of another information processing device 3 to the server 7. The periodic communication established by the periodic communicating part 35 and that established by the communication substitute part 37 are then carried out almost at the same time. The frequency of wake-up when the periodic communication is established after the information processing device 3 is back to normal mode from sleep mode, for example, can be reduced.

The session establishing part 34 of the information processing device 3c establishes the separate session with each server 7a and 7b, and the periodic communicating part 35 establishes the periodic communications with the respective server 7a and 7b.

Figure 6:
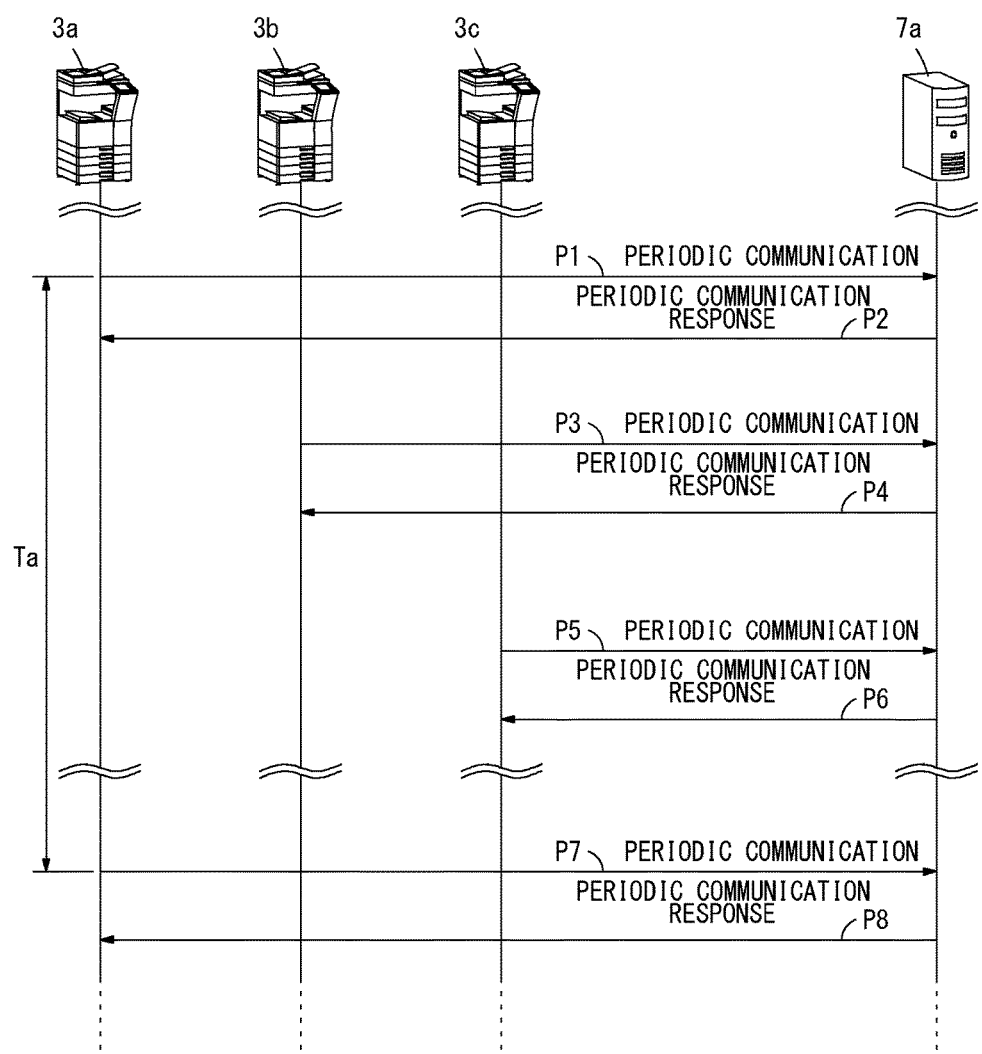
FIG. 6 is a flow diagram explaining an exemplary procedure of operations as the multiple information processing devices are in operation in normal mode.

FIG. 6 is a flow diagram explaining an exemplary procedure of operations as the information processing devices 3a, 3b and 3c are in operation in normal mode. As illustrated in FIG. 6, as the information processing devices 3a, 3b and 3c are in normal mode, it becomes the time for the information processing device 3a to establish the periodic communication with the server 7a. The information processing device 3a then establishes the periodic communication with the server 7a (process P1). When receiving the normal periodic communication from the information processing device 3a, the server 7a replies a periodic communication response to the information processing device 3a, and maintains the session 8a with the information processing device 3a effectively (process P2). It then becomes the time for the information processing device 3b to establish the periodic communication with the server 7a. The information processing device 3b then sends the periodic communication to the server 7a (process P3). When receiving the normal periodic communication from the information processing device 3b, the server 7a replies the periodic communication response to the information processing device 3b, and maintains the session 8b with the information processing device 3b effectively (process P4). It becomes the time for the information processing device 3c to establish the periodic communication with the server 7a. The information processing device 3c then sends the periodic communication to the server 7a (process P5). When receiving the normal periodic communication from the image processing device 3c, the server 7a replies the periodic communication response to the information processing device 3c, and maintains the session 8c with the information processing device 3c effectively (process P6). A predetermined period of time Ta has elapsed from the previous periodic communication, and it is the time for the information processing device 3a to establish the next periodic communication. The information processing device 3a then sends again the periodic communication to the server 7a (process P7). When receiving the normal periodic communication from the information processing device 3a, the server 7a replies the periodic communication response to the information processing device 3a as well as the last time, and maintains the session 8a with the information processing device 3a effectively (process P8). As each of the information processing devices 3a, 3b and 3c that establishes the session with the server 7a is in operation in normal mode, each of the information processing devices 3a, 3b and 3c establishes the separate periodic communication with the server 7 at the certain time intervals (Ta), thereby maintaining the respective sessions effectively.

Figure 7:
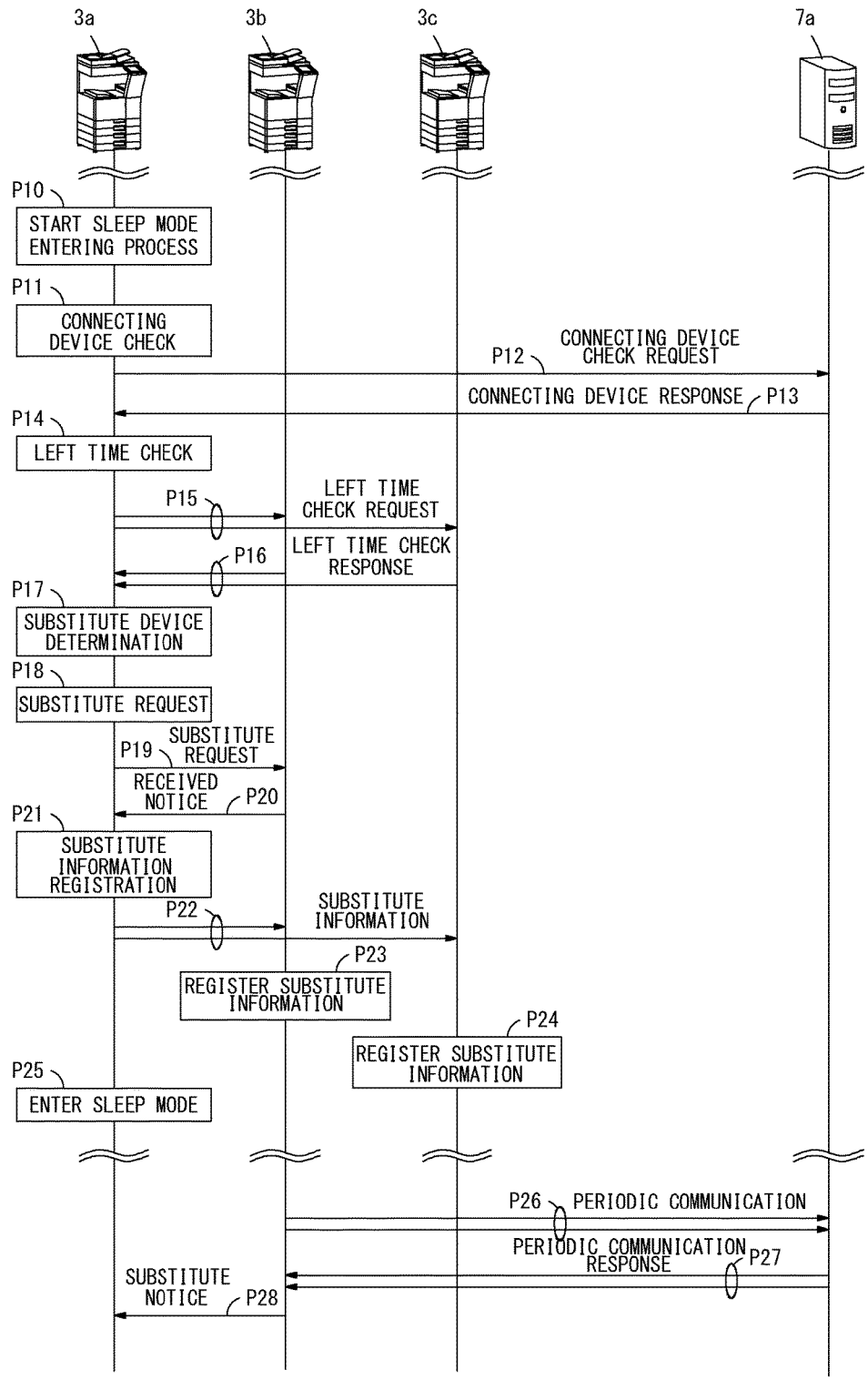
FIG. 7 is a flow diagram explaining an exemplary procedure of a first operation when the information processing device enters sleep mode.

An example when the information processing device 3a enters sleep mode from the state shown in FIG. 6 is explained next. FIG. 7 is a flow diagram explaining an exemplary procedure of an operation when the information processing device 3a enters sleep mode. A predetermined condition to enter sleep mode may be met at the information processing device 3a. In this case, the information processing device 3a starts a sleep mode entering process (process P10). The sleep mode entering process is performed by the substitute requesting part 36. Upon the start of the sleep mode entering process, the substitute requesting part 36 performs a connecting device check at first (process P11). After the connecting device check is performed by the substitute requesting part 36, a connecting device check request is sent to the server 7a from the information processing device 3a (process P12). By sending the connecting device check request, an inquiry about the other information processing devices 3b and 3c that are currently establishing the sessions is made at the server 7a. In response to receiving the connecting device check request, the server 7a replies information relating to the other information processing devices 3b and 3c that are currently establishing the sessions in the same local network 5 at the point to the information processing device 3a as a connecting device response (process P13). With the inquiry, the information processing device 3 is allowed to find the other information processing devices 3b and 3c. In this example, the inquiry is made at the server 7a. However, this is given not for limitation. The information processing device 3a may broadcast commands that request for the responses from the other information processing devices that are establishing the sessions with the server 7a to the local network 5. By having the responses directly from the information processing devices 3b and 3c, the information processing device 3a may find that there are the information processing devices 3b and 3c.

The substitute requesting part 36 of the information processing device 3a performs a left time check to check the times left until the information processing devices 3b and 3c enter sleep mode (process P14). After the left time check is performed by the substitute requesting part 36, a left time request is sent from the information processing device 3a to the information processing devices 3b and 3c (process P15). In response to receiving the left time request, each of the information processing devices 3b and 3c checks the time left until entering sleep mode, and sends the left time response to the information processing device 3a (process P16). The substitute requesting part 36 performs a substitute device determination to determine the single substitute device of the other information processing devices 3b and 3c (process P17). To be more specific, one of the information processing devices 3b and 3c that has the longest time left until entering sleep mode is determined as the substitute device. In this example, the information processing device 3b is determined as the substitute device.

The substitute requesting part 36 of the information processing device 3a then performs a substitute request to send a request to the information processing device 3b determined as the substitute device (process P18). After the substitute request is performed by the substitute requesting part 36, the substitute request is sent to the information processing device 3b from the information processing device 3a (process P19).

Figure 8:
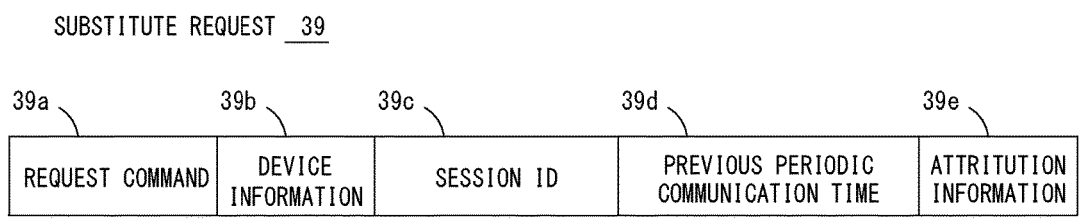
FIG. 8 shows an example of a substitute request.

FIG. 8 shows an example of a substitute request 39 sent at this time. As illustrated in FIG. 8, the substitute request 39 includes a command 39a, device information 39b, a session ID 39c, a time 39d and the other attribution information 39e. The command 39a is to request to serve as the substitute to establish the periodic communication, and the device information 39b is about the information processing device 3a (the device requesting for the substitute). The session ID 39c is the ID of the session that has been established with the server 7a, and the time 39d is the time at which the previous periodic communication with the server 7a is established by the information processing device 3a. The information processing device 3b receives the substitute request 39, thereby appropriately taking over the periodic communication that should be established with the server 7a by the information processing device 3a from the information processing device 3a and establishing the periodic communication for the information processing device 3a. More specifically, the session ID 39c is included in the substitute request 39. For establishing the periodic communication for the information processing device 3a, the information processing device 3b is allowed to send the arrive signal with the session ID of the information processing device 3a to the server 7a. The substitute request 39 also includes the time 39d of the previous periodic communication. The information processing device 3b, therefore, is allowed to establish the periodic communication with the server 7a for the information processing device 3a before the elapse of the predetermined period of time Ta from the previous periodic communication which was established by the information processing device 3a. If the the information processing device 3a serves as the substitute for another information processing device 3, information relating to the periodic communication other than that between the information processing device 3a and the server 7a is recorded as the attribution information 39e. Hence, when the information processing device 3a establishes the periodic communication for another information processing device 3, the information processing device 3b is also allowed to establish the periodic communication for another information processing device 3 besides the information processing device 3a.

After receiving the aforementioned substitute request 39 normally from the information processing device 3a, the information processing device 3b sends a received notice to the information processing device 3a (process P20). In response to receiving the received notice from the information processing device 3b, the substitute requesting part 36 of the information processing device 3a performs a substitute information registration (process P21). To be more specific, the substitute requesting part 36 generates the substitute information and registers the generated substitute information with the substitute management information 30.

The server information relating to the server 7a, the substitute device information relating to the information processing device 3b and the requested device information relating to the information processing device 3a (the device that requested another device to serve as the substitute for it) are associated with each other and registered as the substitute information thereby generated. The substitute requesting part 36 broadcasts the generated substitute information to the information processing devices 3b and 3c (process P22). As a result, the substitute information is registered with the substitute management information 30 in the respective information processing devices 3b and 3c (processes P23 and P24).

FIG. 9 shows an example of the substitute management information 30 in the respective information processing devices 3a, 3b and 3c. The substitute management information 30 includes server information 30a, substitute device information 30b and requested device information 30c associated with each other. Each of the information processing devices 3a, 3b and 3c refers to the substitute management information 30, thereby finding the substitute relations in the local network 5.

After the substitute requesting part 36 completes the above-described process, the information processing device 3a enters sleep mode (process P25). The information processing device 3a has already requested the information processing device 3b to establish the periodic communication with the server 7a for it so that it is not required to back to normal mode at the certain time interval Ta for the periodic communication with the server 7a, resulting in increase in duration of sleep mode.

The information processing device 3b then establishes the periodic communication for the information processing device 3a. Once it is the time to establish the periodic communication with the server 7a, the information processing device 3b establishes the periodic communication with the server 7a (process P26). At this time, both the periodic communicating part 35 and the communication substitute part 37 become operative at the information processing device 3b. The periodic communication by the periodic communicating part 35 and the periodic communication for the information processing device 3a by the communication substitute part 37 are established almost at the same time. To be more specific, the periodic communicating part 35 sends the arrive signal with the session ID of the information processing device 3b to the server 7a and the communication substitute part 37 sends the arrive signal with the session ID of the information processing device 3a to the server 7a. By receiving two kinds of the periodic communications from the information processing device 3b, the server 7a extends effective periods of the session IDs of the respective information processing devices 3a and 3b, and sends two kinds of the periodic communication responses to the information processing device 3b (process P27). In response to receiving the periodic communication response from the server 7a, the communication substitute part 37 of the information processing device 3b sends a substitute notice to the information processing device 3a that has sent the request (process P28). As the information processing device 3a is in sleep mode, the communication interface 22 of the information processing device 3a discards the received substitute notice from the information processing device 3b. The information processing device 3a, therefore, is allowed to be kept in sleep mode.

Figure 10:
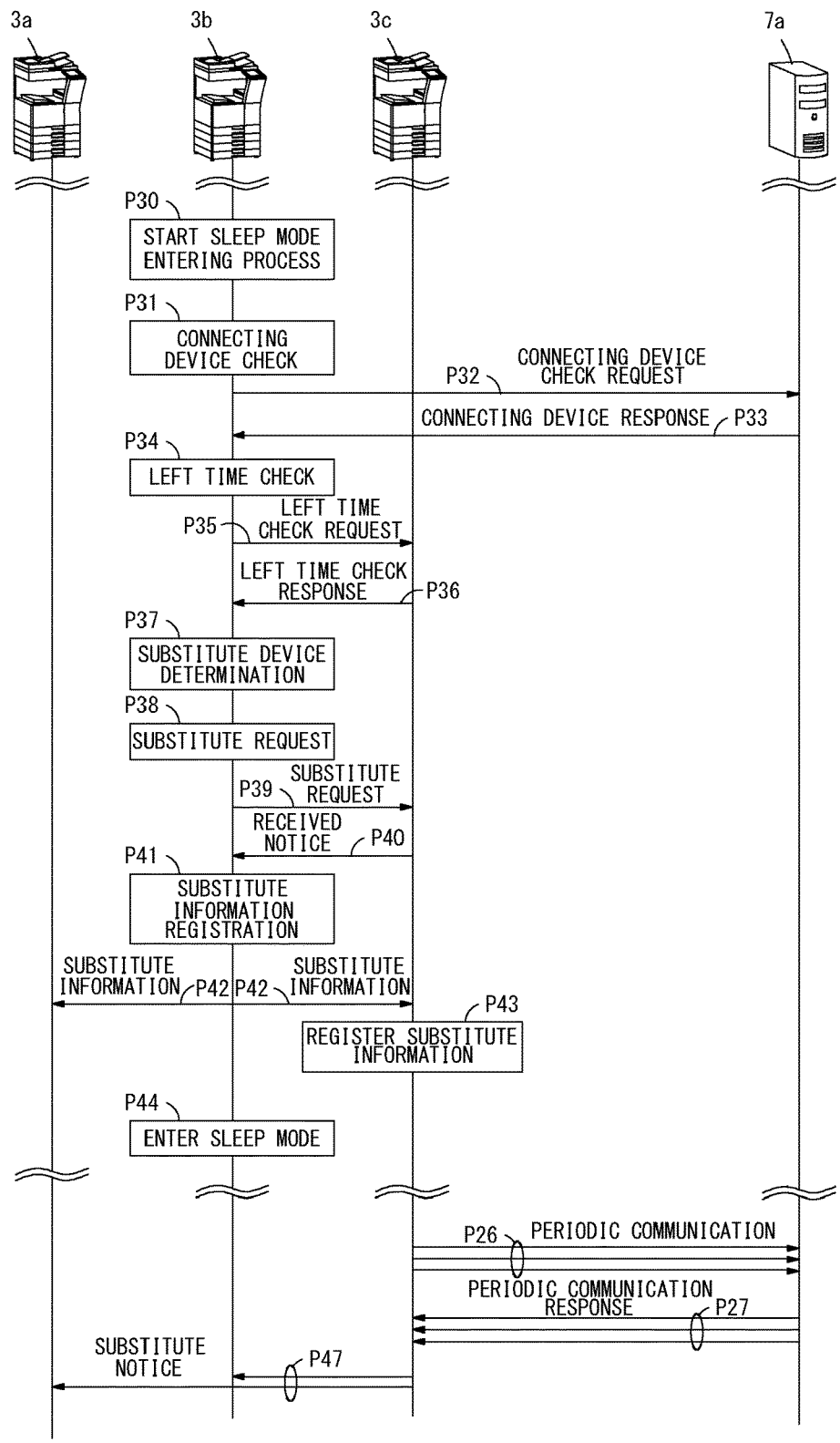
FIG. 10 is a flow diagram explaining an exemplary procedure of a second operation when the information processing device enters sleep mode.

An example when the information processing device 3b enters sleep mode following the information processing device 3a is explained next. FIG. 10 is a flow diagram explaining an exemplary procedure of an operation when the information processing device 3b enters sleep mode. The predetermined condition to enter sleep mode may be met at the information processing device 3b. In this case, the information processing device 3b starts the sleep mode entering process (process P30). The sleep mode entering process is performed by the substitute requesting part 36 of the information processing device 3b. Upon the start of the sleep mode entering process, the substitute requesting part 36 performs the connecting device check at first (process P31). After the connecting device check is performed by the substitute requesting part 36, the connecting device check request is sent to the server 7a from the information processing device 3b (process P32). In response to receiving the connecting device check request, the server 7a replies the information relating to the other information processing devices 3a and 3c that are currently establishing the sessions in the same local network 5 at the point to the information processing device 3b as the connecting device response (process P33). The information processing device 3b is then allowed to find that the information processing devices 3a and 3c are establishing the sessions with the server 7a.

The substitute requesting part 36 of the information processing device 3b performs the left time check to check the times left until the information processing devices 3a and 3c enter sleep mode (process P34). The substitute requesting part 36 of the information processing device 3b refers to the substitute management information 30, thereby finding that the information processing device 3a is in sleep mode and the information processing device 3b is establishing the periodic communication for the information processing device 3a. In such a case, the left time check should be performed towards the information processing device 3c that is not registered with the substitute management information 30. After the left time check is performed by the substitute requesting part 36, the left time request is sent from the information processing device 3b to the information processing device 3c (process P35). In response to receiving the left time request, the information processing device 3c checks the time left until entering sleep mode, and sends the left time response to the information processing device 3b (process P36). The substitute requesting part 36 of the information processing device 3b performs the substitute device determination to determine the information processing device 3c as the substitute device if the information processing device 3c has the longer left time than the information processing device 3b (process P37).

The substitute requesting part 36 of the information processing device 3b then performs the substitute request to send the request to the information processing device 3c determined as the substitute device (process P38). After the substitute request is performed by the substitute requesting part 36, the substitute request is sent to the information processing device 3c from the information processing device 3b (process P39). The substitute request thereby sent is the same as that shown in FIG. 8. The information processing device 3b serves as the substitute for the information processing device 3a to establish the periodic communication so that the attribution information 39e also includes information to establish the periodic communication for the information processing device 3a.

After receiving the substitute request normally from the information processing device 3b, the information processing device 3c sends the received notice to the information processing device 3b (process P40). In response to receiving the received notice from the information processing device 3c, the substitute requesting part 36 of the information processing device 3b performs the substitute information registration (process P41). To be more specific, the substitute requesting part 36 of the information processing device 3b generates the substitute information. The server information relating to the server 7a, the substitute device information relating to the information processing device 3c and the requested device information relating to the information processing device 3b (the device that requested another device to serve as the substitute for it) are associated with each other. The substitute requesting part 36 of the information processing device 3b also generates the substitute information that includes the server information relating to the server 7a, the substitute device information relating to the information processing device 3c and the requested device information relating to the information processing device 3a associated with each other. The substitute requesting part 36 of the information processing device 3b then registers both of the generated substitute information with the substitute management information 30. The substitute requesting part 36 broadcasts the generated substitute information to the information processing devices 3a and 3c (process P42). As a result, the substitute information is registered with the information processing device 3c, and the substitute management information 30 is updated (process P43). The information processing device 3a is in sleep mode so that it does not register the substitute information.

Figure 11:
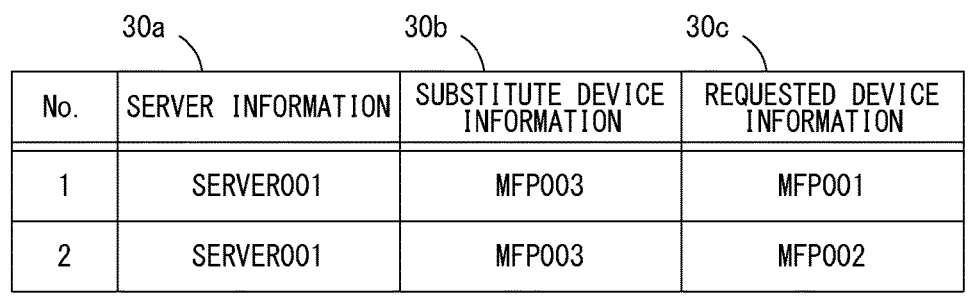
FIG. 11 shows an example of the substitute management information updated at the information processing device.

FIG. 11 shows an example of the substitute management information 30 in the respective information processing devices 3b and 3c. The processes P41 to P43 are performed so that the substitute management information 30 in the respective information processing devices 3b and 3c is updated to the information shown in FIG. 11. The substitute management information 30 includes the information showing that the information processing device 3c serves as the substitute for the information processing device 3a to establish the periodic communication with the server 7a that should be established by the information processing device 3a and the information showing that the information processing device 3c serves as the substitute for the information processing device 3b to establish the periodic communication with the server 7a that should be established by the information processing device 3b.

After the substitute requesting part 36 completes the above-described process, the information processing device 3b enters sleep mode (process P44). The information processing device 3b has already requested the information processing device 3c to establish the periodic communications with the server 7a for the information processing devices 3a and 3b so that it is not required to back to normal mode at the certain time interval Ta for the periodic communications with the server 7a, resulting in increase in duration of sleep mode.

The information processing device 3c then establishes the periodic communications for the information processing devices 3a and 3b. Once it is the time to establish the periodic communications with the server 7a, the information processing device 3c establishes the periodic communications with the server 7a (process P45). At this time, both the periodic communicating part 35 and the communication substitute part 37 become operative at the information processing device 3c. The periodic communication by the periodic communicating part 35 and the periodic communications for the information processing devices 3a and 3b by the communication substitute part 37 are established almost at the same time. To be more specific, the periodic communicating part 35 sends the arrive signal with the session ID of the information processing device 3c (itself) to the server 7a. Almost at the same time, the communication substitute part 37 sends the arrive signal with the session ID of the information processing device 3a and the arrive signal with the session ID of the information processing device 3b to the server 7a. By receiving three kinds of the periodic communications from the information processing device 3c, the server 7a extends effective periods of all the session IDs of the respective information processing devices 3a, 3b and 3c, and sends three kinds of the periodic communication responses to the information processing device 3c (process P46). In response to receiving the periodic communication responses from the server 7a, the communication substitute part 37 of the information processing device 3c sends the substitute notices to the information processing devices 3a and 3b (process P47). As the information processing devices 3a and 3b are in sleep mode, the communication interface 22 of each of the information processing devices 3a and 3b discards the received substitute notice from the information processing device 3c. The information processing devices 3a and 3c, therefore, are allowed to be kept in sleep mode.

Figure 12:
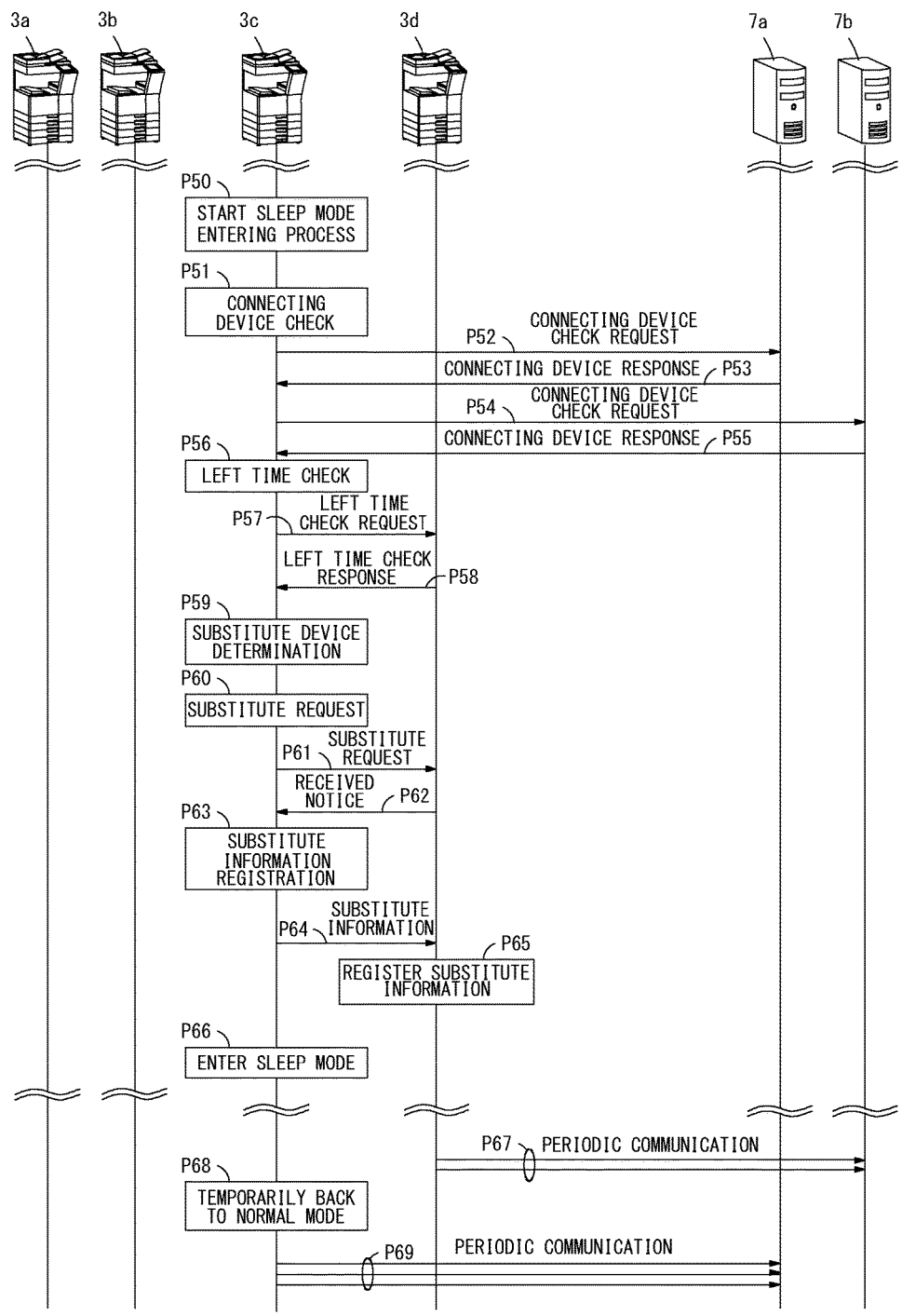
FIG. 12 is a flow diagram explaining an exemplary procedure of a third operation when the information processing device enters sleep mode.

An example when the information processing device 3c enters sleep mode following the information processing devices 3a and 3b is explained next. FIG. 12 is a flow diagram explaining an exemplary procedure of an operation when the information processing device 3c enters sleep mode. The predetermined condition to enter sleep mode may be met at the information processing device 3c. In this case, the information processing device 3c starts the sleep mode entering process (process P50). The sleep mode entering process is performed by the substitute requesting part 36 of the information processing device 3c. Upon the start of the sleep mode entering process, the substitute requesting part 36 performs the connecting device check at first (process P51). The information processing device 3c is establishing the session 8c with the server 7a and the session 9a with the server 7b at the same time. The substitute requesting part 36 performs the connecting device check for both the servers 7a and 7b. After the connecting device check is performed by the substitute requesting part 36, the connecting device check request is sent to the server 7a from the information processing device 3c (process P52). In response to receiving the connecting device check request, the server 7a replies the information relating to the other information processing devices 3a and 3b that are currently establishing the sessions in the same local network 5 at the point to the information processing device 3c as the connecting device response (process P53). The connecting device check request is also sent to the server 7b from the substitute requesting part 36 of the information processing device 3c (process P54). In response to receiving the connecting device check request, the server 7b replies the information relating to another information processing device 3d that is currently establishing the session in the same local network 5 at the point to the information processing device 3c as the connecting device response (process P55). The information processing device 3c is then allowed to find that the information processing devices 3a and 3b are establishing the sessions with the server 7a and the information processing device 3d is establishing the session with the server 7b.

The substitute requesting part 36 of the information processing device 3c performs the left time check to check the times left until the other information processing devices 3a, 3b and 3d enter sleep mode (process P56). The substitute requesting part 36 of the information processing device 3c refers to the substitute management information 30, thereby finding that the information processing devices 3a and 3b are in sleep mode and the information processing device 3c is establishing the periodic communications for the respective information processing devices 3a and 3b. In such a case, the left time check should be only performed towards the information processing device 3d that is not registered with the substitute management information 30. After the left time check is performed by the substitute requesting part 36, the left time request is sent from the information processing device 3c to the information processing device 3d (process P57). In response to receiving the left time request, the information processing device 3d checks the time left until entering sleep mode, and sends the left time response to the information processing device 3c (process P58). The substitute requesting part 36 of the information processing device 3c performs the substitute device determination to determine the information processing device 3d as the substitute device if the information processing device 3d has the longer left time than the information processing device 3c (process P59). The information processing device 3d, however, has not established the session with the server 7a. The information processing device 3d is not allowed to establish the periodic communications with the server 7a for the information processing devices 3a, 3b and 3c. The information processing device 3c, therefore, determines the information processing device 3d as the substitute device to establish the periodic communication with the server 7b for it.

The substitute requesting part 36 of the information processing device 3c then performs the substitute request to send the request to the information processing device 3d determined as the substitute device (process P60). After the substitute request is performed by the substitute requesting part 36, the substitute request is sent to the information processing device 3d from the information processing device 3c (process P61). The substitute request thereby sent is also the same as that shown in FIG. 8. More specifically, the session ID 39c of the substitute request 39 includes the session ID of the session established between the information processing device 3c and the server 7b. The information processing device 3d is not allowed to serve as the substitute for the information processing devices 3a and 3b to establish the periodic communications with the server 7a so that the attribution information 39e does not include the information to establish the periodic communications for the information processing devices 3a and 3b.

After receiving the substitute request normally from the information processing device 3c, the information processing device 3d sends the received notice to the information processing device 3c (process P62). In response to receiving the received notice from the information processing device 3d, the substitute requesting part 36 of the information processing device 3c performs the substitute information registration (process P63). To be more specific, the substitute requesting part 36 of the information processing device 3c generates the substitute information. The server information relating to the server 7b, the substitute device information relating to the information processing device 3d and the requested device information relating to the information processing device 3c (the device that requested another device to serve as the substitute for it) are associated with each other and registered as the substitute information thereby generated. The substitute requesting part 36 of the information processing device 3c then registers the generated substitute information with the substitute management information 30. The substitute requesting part 36 broadcasts the generated substitute information to the information processing devices 3a, 3b and 3d (process P64). As a result, the substitute information is registered with the information processing device 3d, and the substitute management information 30 is updated (process P65). The information processing devices 3a and 3b are in sleep mode so that they do not register the substitute information.

FIG. 13 shows an example of the substitute management information 30 in the respective information processing devices 3c and 3d. The above-described processes P63 to P65 are performed so that the substitute management information 30 in the respective information processing devices 3c and 3d is updated to the information shown in FIG. 13. The substitute management information 30 includes the information showing that the information processing device 3c serves as the substitute for the information processing devices 3a and 3b to establish the periodic communications with the server 7a that should be established by the information processing devices 3a and 3b and the information showing that the information processing device 3d serves as the substitute for the information processing device 3c to establish the periodic communication with the server 7b that should be established by the information processing device 3c.

After the substitute requesting part 36 completes the above-described process, the information processing device 3c enters sleep mode (process P66). The information processing device 3c has already requested the information processing device 3d to establish the periodic communication with the server 7b for the information processing device 3c so that it is not required to back to normal mode at the certain time interval for the periodic communication with the server 7b. The information processing device 3c, however, is required to establish the periodic communications with the server 7a that should be established by the information processing devices 3a, 3b and 3c. After entering sleep mode, the information processing device 3c is back to normal mode from sleep mode to establish the periodic communications every time it becomes the time to establish the periodic communications with the server 7a.

The information processing device 3d then establishes the periodic communication for the information processing device 3c. Once it is the time to establish the periodic communications with the server 7b, the information processing device 3d establishes the periodic communications with the server 7b (process P67). At this time, both the periodic communicating part 35 and the communication substitute part 37 become operative at the information processing device 3d. The periodic communication by the periodic communicating part 35 and the periodic communication for the information processing device 3c by the communication substitute part 37 are established almost at the same time. To be more specific, the periodic communicating part 35 sends the arrive signal with the session ID of the information processing device 3d (itself) to the server 7b. Almost at the same time, the communication substitute part 37 sends the arrive signal with the session ID of the information processing device 3c to the server 7b. As a result, not only the session established between the information processing device 3d and the server 7b but also the session established between the information processing device 3c and the server 7b may be maintained effectively.

Once it is the time to establish the periodic communications with the server 7a, the information processing device 3c is temporarily back to normal mode from sleep mode (process P68), and establishes the periodic communications with the server 7a (process P69). At this time, both the periodic communicating part 35 and the communication substitute part 37 become operative at the information processing device 3c. The periodic communication by the periodic communicating part 35 and the periodic communications for the information processing devices 3a and 3b by the communication substitute part 37 are established almost at the same time. To be more specific, the periodic communicating part 35 sends the arrive signal with the session ID of the information processing device 3c (itself) to the server 7a. Almost at the same time, the communication substitute part 37 sends the arrive signal with the session ID of the information processing device 3a and the arrive signal with the session ID of the information processing device 3b to the server 7a. As a result, the session established between each of the information processing devices 3a, 3b and 3c and the server 7a may be maintained effectively.

Figure 14:
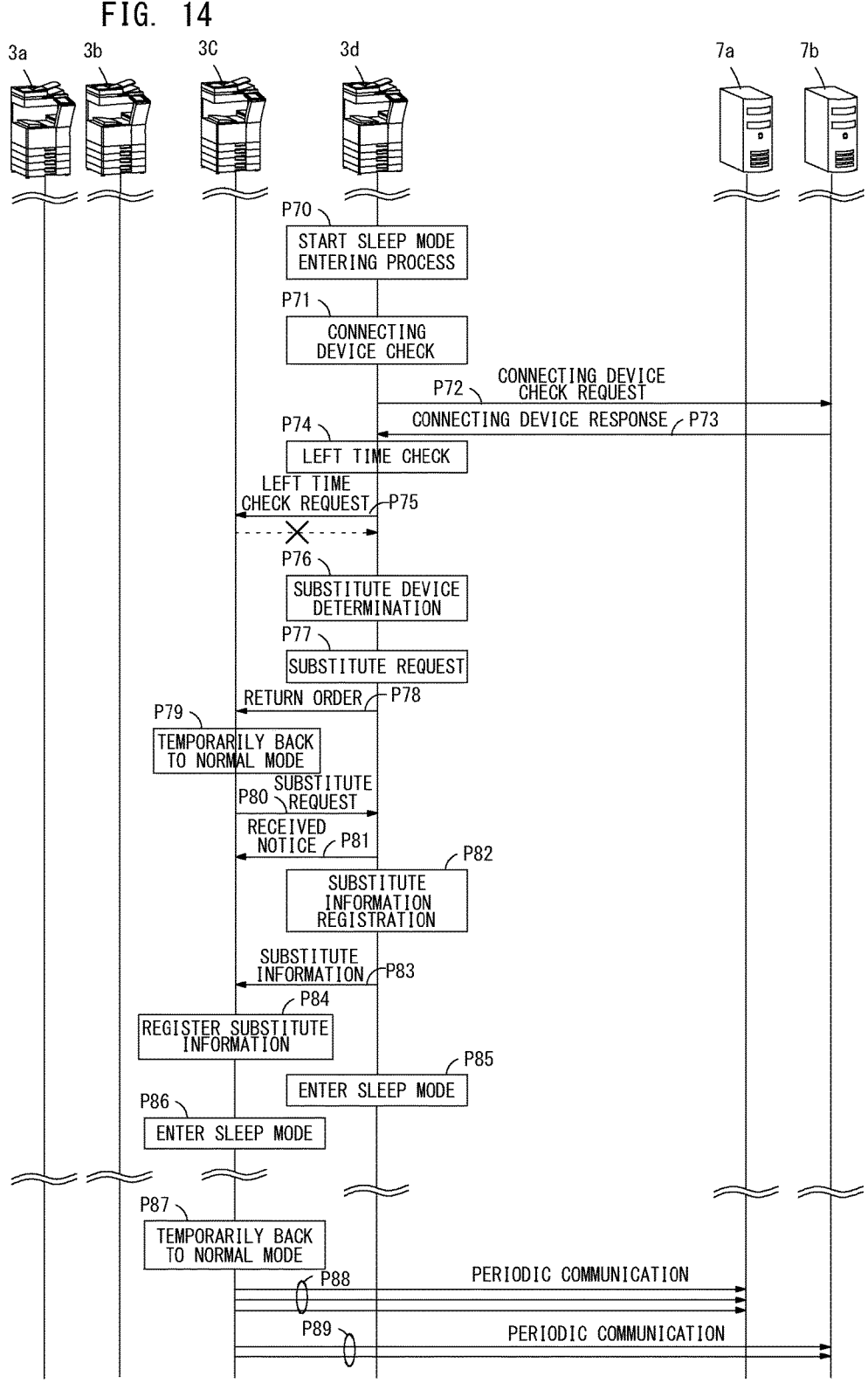
FIG. 14 is a flow diagram explaining an exemplary procedure of a fourth operation when the information processing device enters sleep mode.

An example when the information processing device 3d enters sleep mode following the information processing devices 3a, 3b and 3c is explained next. FIG. 14 is a flow diagram explaining an exemplary procedure of an operation when the information processing device 3d enters sleep mode. The predetermined condition to enter sleep mode may be met at the information processing device 3d. In this case, the information processing device 3d starts the sleep mode entering process (process P70). The sleep mode entering process is performed by the substitute requesting part 36 of the information processing device 3d. Upon the start of the sleep mode entering process, the substitute requesting part 36 performs the connecting device check at first (process P71). After the connecting device check is performed by the substitute requesting part 36, the connecting device check request is sent to the server 7b from the information processing device 3d (process P72). In response to receiving the connecting device check request, the server 7b replies the information relating to another information processing device 3c that is currently establishing the session in the same local network 5 at the point to the information processing device 3d as the connecting device response (process P73). The information processing device 3d is then allowed to find that the information processing device 3c is establishing the session with the server 7b.

The substitute requesting part 36 of the information processing device 3d performs the left time check to check the time left until another information processing device 3c enters sleep mode (process P74). After the left time check is performed by the substitute requesting part 36, the left time request is sent from the information processing device 3d to the information processing device 3c (process P75). As the information processing device 3c is in sleep mode, the communication interface 22 of the information processing device 3c discards the received left time request from the information processing device 3d. Even when sending the left time request, the information processing device 3d never receives the left time response from the information processing device 3c in the predetermined period of time. The information processing device 3d then finds that the information processing device 3c is in sleep mode. However, this is given not for limitation. The substitute requesting part 36 of the information processing device 3d may find that the information processing device 3c is in sleep mode by referring to the substitute management information 30.

It is assumed that another information processing device 3c that is establishing the session with the same server 7b in the same local network 5 is in sleep mode. In this case, the information processing device 3d performs the substitute device determination to determine which of the information processing device 3d or 3c is appropriate as the substitute device (process P76). In the process P76, it is determined if there is the device that establishes the session with another server 7a of the multiple information processing devices 3c and 3*d* that establish the sessions with the same server 7*b* by referring to the substitute management information 30. If there is the device that establishes the session with another server 7*a*, the device is determined as the substitute device. The substitute requesting part 36 of the information processing device 3*d* refers to the substitute management information 30, thereby finding that the information processing device 3*c* in sleep mode also establishes the session with another server 7*a* so that the information processing device 3*c* is determined as the substitute device.

The substitute requesting part 36 of the information processing device 3*d* performs the substitute request to send the request to the information processing device 3*c* determined as the substitute device (process P77). After the substitute request is started by the substitute requesting part 36, the substitute request is sent to the information processing device 3*c* from the information processing device 3*d* (process P78). The information processing device 3*c* is temporarily back to normal mode from sleep mode (process P79). The substitute request is then sent to the information processing device 3*d* from the information processing device 3*c* (process P80). The substitute request sent at this time is also the same as that shown in FIG. 8. More specifically, the session ID 39*c* of the substitute request 39 includes the session ID of the session established between the information processing device 3*d* and the server 7*b*. The information processing device 3*d* serves as the substitute for the information processing device 3*c* to establish the periodic communication so that the attribution information 39*e* includes the information to establish the periodic communication for the information processing device 3*c*.

In response to receiving the substitute request normally from the information processing device 3*d* after back to normal mode, the information processing device 3*c* sends the received notice to the information processing device 3*d* (process P81). In response to receiving the received notice from the information processing device 3*c*, the substitute requesting part 36 of the information processing device 3*d* performs the substitute information registration (process P82). To be more specific, the substitute requesting part 36 of the information processing device 3*d* generates the substitute information. The server information relating to the server 7*b*, the substitute device information relating to the information processing device 3*c* and the requested device information relating to the information processing device 3*d* (the device that requested another device to serve as the substitute for it) are associated with each other and registered as the substitute information thereby generated. The substitute requesting part 36 of the information processing device 3*d* then registers the generated substitute information with the substitute management information 30. The substitute requesting part 36 broadcasts the generated substitute information to the information processing devices 3*a*, 3*b* and 3*c* (process P83). As a result, the substitute information is registered with the information processing device 3*c*, and the substitute management information 30 is updated (process P84). The information processing devices 3*a* and 3*b* are in sleep mode so that they do not register the substitute information.

Figure 15:
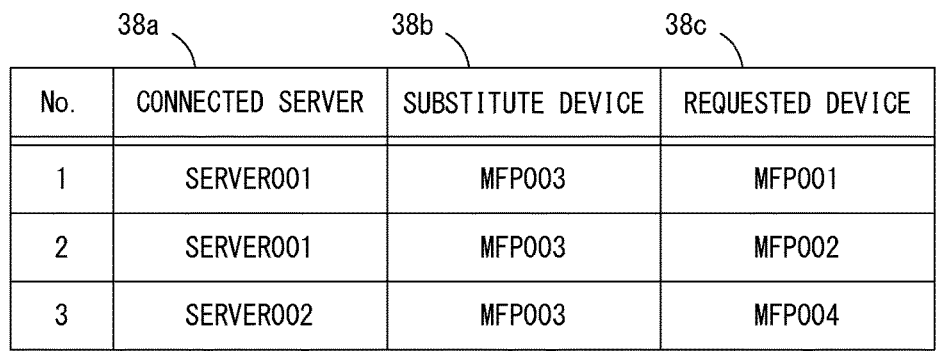
FIG. 15 shows an example of the substitute management information updated at the information processing device.

FIG. 15 shows an example of the substitute management information 30 updated at the respective information processing devices 3*c* and 3*d*. The above-described processes P82 to P84 are performed so that the substitute management information 30 in the respective information processing devices 3*c* and 3*d* is updated to the information shown in FIG. 15. The substitute management information 30 includes the information showing that the information processing device 3*c* serves as the substitute for the information processing devices 3*a* and 3*b* to establish the periodic communications with the server 7*a* that should be established by the respective information processing devices 3*a* and 3*b* and the information showing that the information processing device 3*c* serves as the substitute for the information processing device 3*d* to establish the periodic communication with the server 7*b* that should be established by the information processing device 3*d*.

After the substitute requesting part 36 completes the above-described process, the information processing device 3*d* enters sleep mode (process P85). The information processing device 3*d* has already requested the information processing device 3*c* to establish the periodic communication with the server 7*b* for the information processing device 3*d* so that it is not required to back to normal mode at the certain time interval for the periodic communication with the server 7*b*.

The information processing device 3*c* enters again sleep mode after registering the substitute information (process P86). The information processing device 3*c* is required to establish the periodic communications with the servers 7*a* and 7*b* that should be established by the respective information processing devices 3*a*, 3*b*, 3*c* and 3*d*. Even after entering sleep mode, the information processing device 3*c* is back to normal mode from sleep mode every time it becomes the time to establish the periodic communication with the server 7*a* or 7*b*, and establishes the periodic communication. Once it is the time to establish the periodic communications with the respective servers 7*a* and 7*b*, the information processing device 3*c* is temporarily back to normal mode from sleep mode (process P87), and establishes the periodic communications with the respective servers 7*a* and 7*b* (processes P88 and P89). To be more specific, the information processing device 3*c* establishes not only the periodic communications with the respective servers 7*a* and 7*b* that should be established between itself and the respective servers 7*a* and 7*b* but also the periodic communications with the server 7*a* that should be established between the respective other information processing devices 3*a* and 3*b* and the server 7*a* for the other information processing devices 3*a* and 3*b* and the periodic communication with the server 7*b* that should be established between the information processing device 3*d* and the server 7*b* for the information processing device 3*d*. As a result, the number of the devices that are back to normal mode from sleep mode for the periodic communications with the respective servers 7*a* and 7*b* of the multiple information processing devices 3*a*, 3*b*, 3*c* and 3*d* installed in the local network 5 can be reduced, resulting in the better power-saving effect as a whole system. When the information processing device 3*c* is temporarily back to normal mode from sleep mode for the periodic communications with the respective servers 7*a* and 7*b*, it immediately enters again sleep mode after completing the periodic communications with the respective servers 7*a* and 7*b*.

In the example of FIG. 14, the information processing device 3*c* establishes the periodic communications with both of the servers 7*a* and 7*b* when it is back to normal mode from sleep mode. The time interval between the periodic communications with the server 7*a* and the time interval between the periodic communications with the server 7*b* may be different. In such a case, the information processing device 3*c* is temporarily back to normal mode from sleep mode at a time to establish the periodic communication with the server 7*a*. Also, the information processing device 3*c* is temporarily back to normal mode from sleep mode at a time to establish the periodic communication with the server 7*b*.

Figure 16:
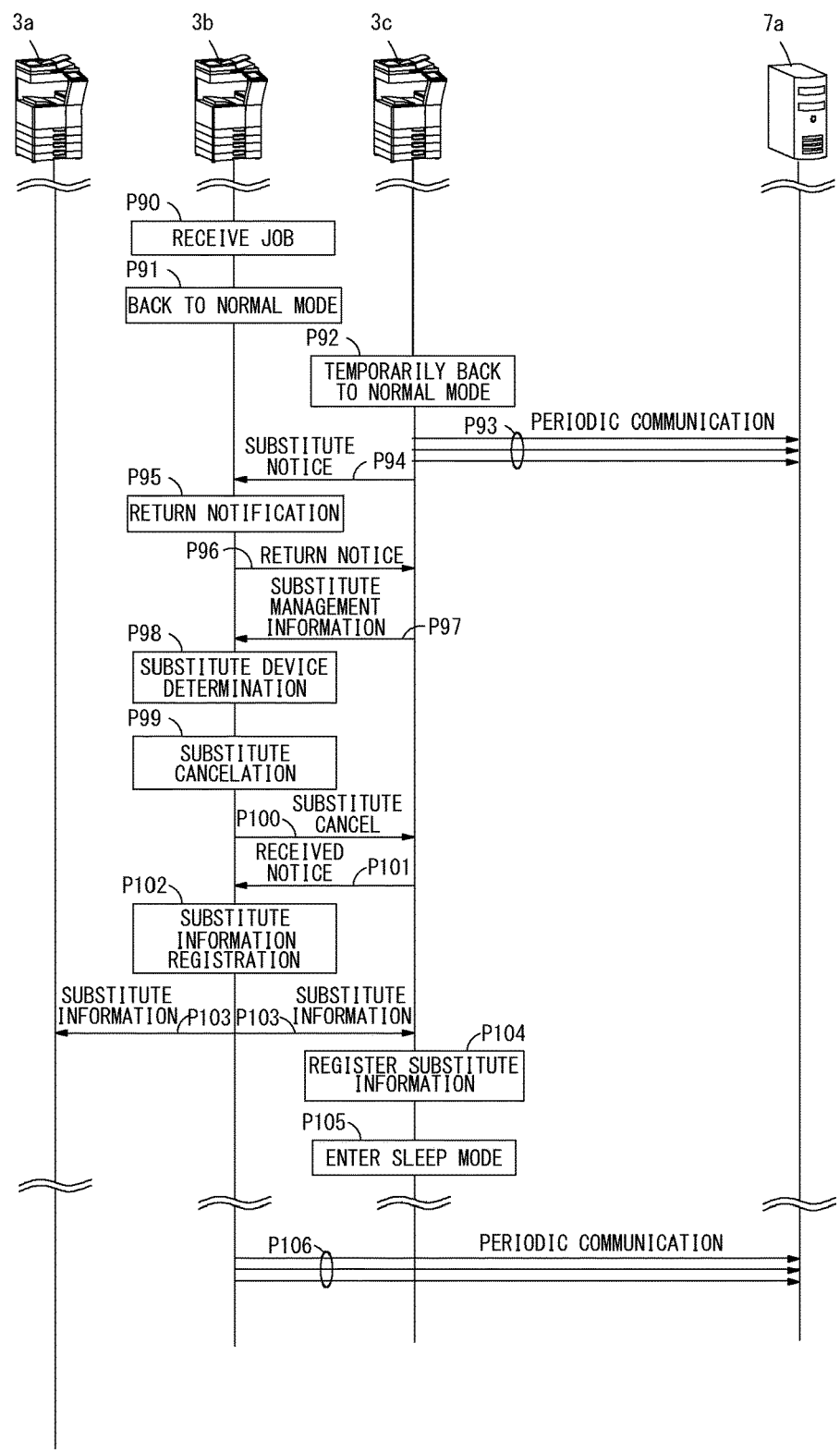
FIG. 16 is a flow diagram explaining an exemplary procedure of an operation when the information processing device is back to normal mode.

As described above, an example of an operation as the information processing device 3c establishes the periodic communication with the server 7a by being back to normal mode from sleep mode on the periodical basis, the information processing device 3b receives the job over the local network 5 so that it is back to normal mode, and it establishes the periodical communication with the server 7a for the information processing device 3c is explained. FIG. 16 is a flow diagram explaining an exemplary procedure of an operation when the information processing device 3b is back to normal mode. When the information processing device 3b receives the job during sleep mode (process P90), the communication interface 22 notifies the power controller 23 of the receipt of the job so that the power controller 23 restarts the power supply to the main controller 20, and the information processing device 3b is back to normal mode from sleep mode (process P91). The main controller 20 of the information processing device 3b brings the job controller 32 into operation to execute the received job. The power controller 23 of the information processing device 3b keeps normal mode until the condition to enter sleep mode is met. The information processing device 3b has requested the the information processing device 3c to establish the periodic communication with the server 7a for it, so it does not establish the periodic communication with the server 7a at this point even when it is back to normal mode.

As the information processing device 3b is in normal mode, the information processing device 3c may be back to normal mode from sleep mode for the periodic communication with the server 7a (process P92). The information processing device 3c then establishes the periodic communication with the server 7a (process P93). The information processing device 3c sends three kinds of periodic communications corresponding to the sessions between the server 7a and the respective information processing devices 3a, 3b and 3c to the server 7a. As establishing the periodic communications with the server 7a, the information processing device 3c sends the substitute notice to the information processing devices 3a and 3b (process P94). In response to receiving the substitute notice, the information processing device 3b brings the substitute requesting part 36 into operation to perform a wake-up notification (process P95). The information processing device 3a is in sleep mode so that the substitute notice from the information processing device 3c is discarded.

The substitute requesting part 36 of the information processing device 3b performs the wake-up notification, then the wake-up notice is sent from the information processing device 3b to the information processing device 3c (process P96). With the wake-up notice, the information processing device 3c that has established the periodic communication for the information processing device 3b is notified that the information processing device 3b is back to normal mode. After receiving the wake-up notice in response to the substitute notice, the information processing device 3c reads the substitute management information 30 in the storage 24, and sends the substitute management information 30 to the information processing device 3b (process P97). In response to receiving the substitute management information 30 from the information processing device 3c, the information processing device 3b analyzes the substitute management information 30, thereby finding the current substitute relations in the local network 5. For sending the substitute management information 30 to the information processing device 3b, the information processing device 3c sends current status information of the information processing device 3c at the same time. The status information thereby sent includes information that shows the information processing device 3c has been temporarily back to normal mode from sleep mode for the periodic communication with the server 7a. The information processing device 3b analyzes the status information, thereby finding that the information processing device 3c has been been temporarily back to normal mode from sleep mode for the periodic communication with the server 7a.

The information processing device 3b performs the substitute device determination (process P98). The information processing device 3c may have been temporarily back to normal mode from sleep mode for the periodic communication with the server 7a. In this case, the information processing device 3b determines itself as the substitute device to establish the periodic communications for the information processing devices 3a and 3c in the substitute device determination. The information processing device 3b then performs a substitute cancelation to cancel establishing the periodic communication for the information processing device 3c (process P99). The substitute requesting part 36 of the information processing device 3b performs the substitute cancelation, and a substitute cancel is sent from the information processing device 3b to the information processing device 3c (process P100). After receiving the substitute cancel from the information processing device 3b, the information processing device 3c deletes the whole information registered with its substitute management information 30, and sends the received notice to the information processing device 3b (process P101).

After receiving the received notice from the information processing device 3c, the substitute requesting part 36 of the information processing device 3b performs the substitute information registration (process P102). To be more specific, the substitute requesting part 36 of the information processing device 3b generates the substitute information. The server information relating to the server 7a, the substitute device information relating to the information processing device 3b (the device that has requested another device to serve as the substitute) and the requested device information relating to the information processing device 3a are associated with each other and registered as the substitute information thereby generated. The substitute requesting part 36 of the information processing device 3b also generates the substitute information that includes the server information relating to the server 7a, the substitute device information relating to the information processing device 3b (the device that has requested another device to serve as the substitute) and the requested device information relating to the information processing device 3c associated with each other. The substitute requesting part 36 of the information processing device 3b then registers both of the generated substitute information with the substitute management information 30. The substitute requesting part 36 broadcasts the generated substitute information to the information processing devices 3a and 3c (process P103). As a result, the substitute information is also registered with the information processing device 3c, and the substitute management information 30 is updated (process P104). The information processing device 3a is in sleep mode so that it does not register the substitute information. Through the process, all the periodic communications that should be established by the information processing device 3c with the server 7a including the periodic communications with the server 7a established for another information processing device are transferred to the information processing device 3b.

After completing the above-described process, the information processing device 3c enters sleep mode (process P105). The information processing device 3c has already requested the information processing device 3b to establish the periodic communications with the server 7a for the information processing devices 3a and 3c so that it is not required to back to normal mode at the certain time interval for the periodic communications with the server 7a The information processing device 3b then establishes the periodic communications for the information processing devices 3a and 3b. Once it is the time to establish the periodic communications with the server 7a, the information processing device 3b establishes the periodic communications with the server 7a (process P106). At this time, both the periodic communicating part 35 and the communication substitute part 37 become operative at the information processing device 3b. The periodic communication by the periodic communicating part 35 and the periodic communications for the information processing devices 3a and 3c by the communication substitute part 37 are established almost at the same time. As a result, the sessions between the server 7a and the respective information processing devices 3a, 3b and 3c are maintained effectively.

Figure 17:
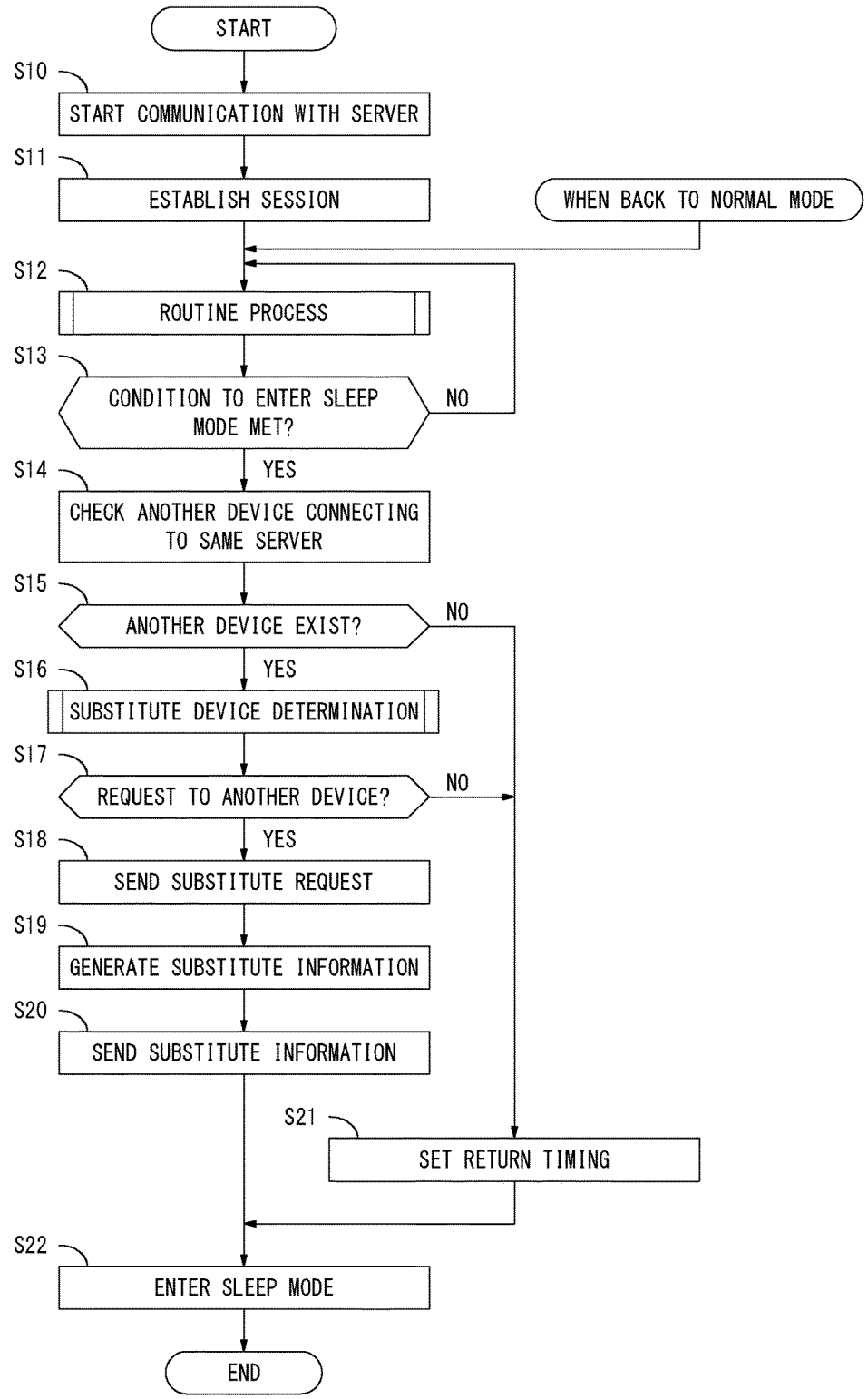
FIG. 17 is a flow diagram explaining an exemplary sequential procedure of a process at the information processing device.
Figure 18:
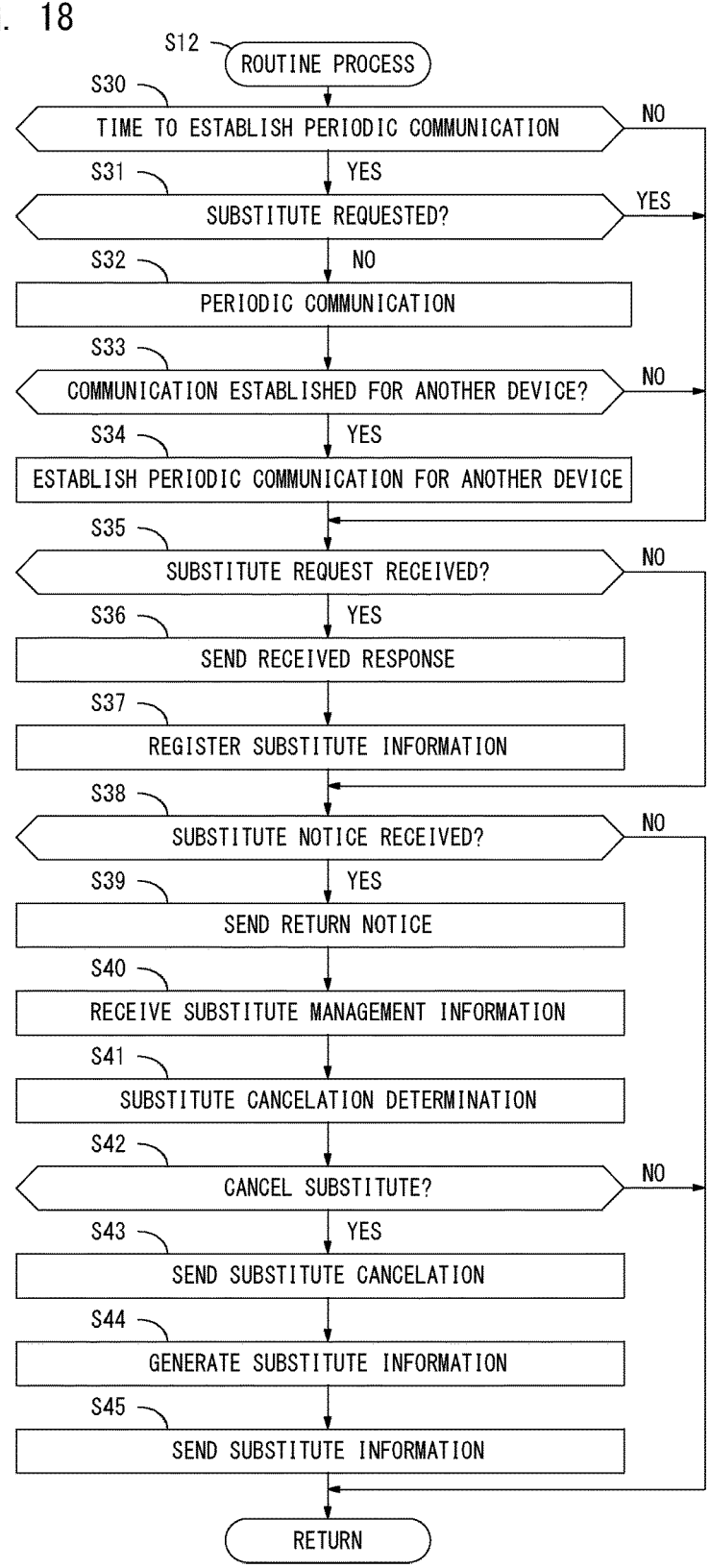
FIG. 18 is a flow diagram explaining an exemplary sequential procedure of a routine process in detail.
Figure 19:
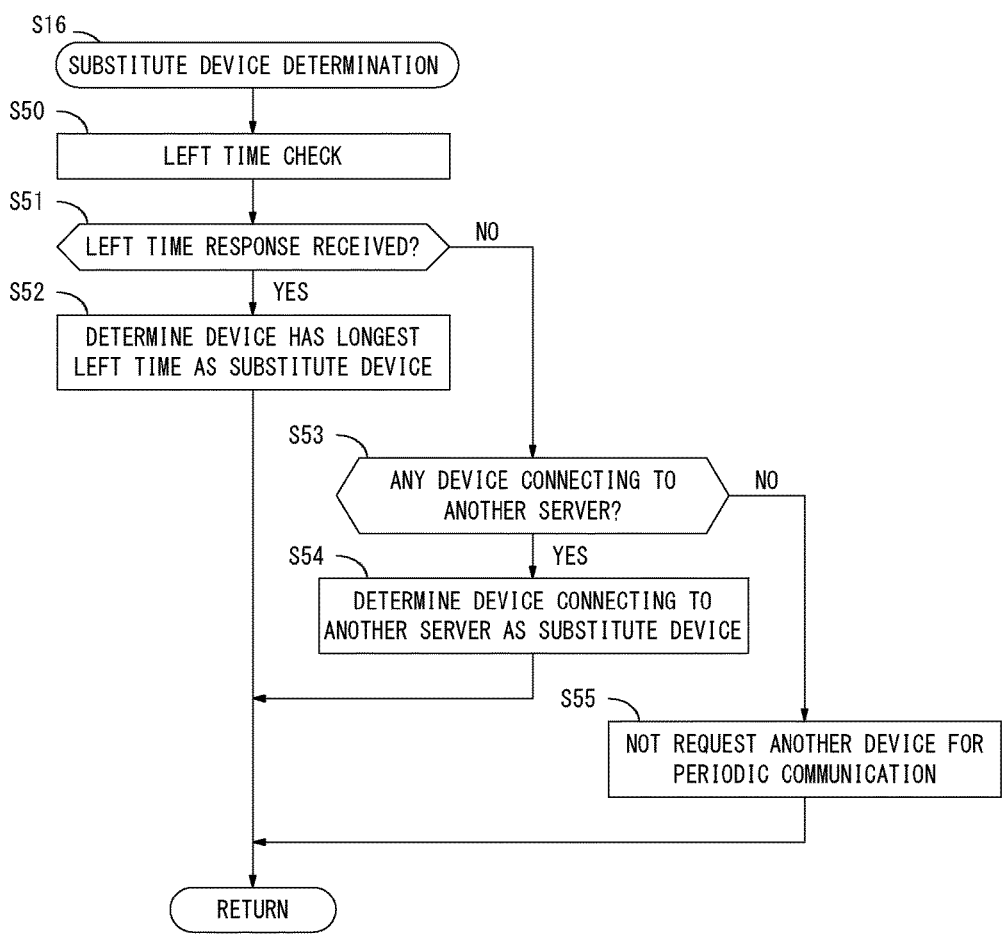
FIG. 19 is a flow diagram explaining an exemplary sequential procedure of a substitute device determination in detail.

A detailed sequential procedure of a process performed the information processing device 3 is explained next. FIGS. 17 to 19 are flow diagrams explaining exemplary sequential procedures of the processes at the information processing device 3. The process shows one of exemplary sequential procedures performed one after the other when the CPU of the main controller 20 executes the application program 29.

As shown in FIG. 17, upon start of the process, the information processing device 3 accesses an address set in advance with the application 31, thereby starting the communication with the server 7 (step S10), and establishes the session with the server 7 (step S11). The information processing device 3 repeats a routine process until the condition to enter sleep mode is met (step S12). The information processing device 3 restarts from the routine process (step S12) when it is back to normal mode from sleep mode.

FIG. 18 is a flow diagram explaining an exemplary sequential procedure of the routine process (step S12) in detail. Upon start of the process, the information processing device 3 determines if it is the time to establish the periodic communication with the server 7 (step S30). It may be the time to establish the periodic communication with the server 7 (when a result of step S30 is YES). In this case, the information processing device 3 determines if it has already requested another device to establish the periodic communication for it (step S31). The information processing device 3 may not have requested another device to establish the periodic communication for it yet (when a result of step S31 is NO). In such a case, the information processing device 3 establishes the periodic communication with the server 7 (step S32), and maintains the session with the server 7 effectively. The information processing device 3 then refers to the substitute management information 30, thereby determining whether or not it has established the periodic communication for another device that should be established by another device (step S33). When the information processing device 3 has established the periodic communication for another device (when a result of step S33 is YES), it establishes the periodic communication with the server 7 for another device (step S34). The session with the server 7 established by another device may also be maintained effectively. When the information processing device 3 has not established the periodic communication for another device (when a result of step S33 is NO), it skips the process in step S34. It may not be the time to establish the periodic communication with the server 7 (when a result of step S30 is NO), or the information processing device 3 may have already requested another device to establish the periodic communication for it (when a result of step S31 is YES). In this case, the information processing device 3 skips the processes in steps S32, S33 and S34.

The information processing device 3 determines if the substitute request is received from another device (step S35). When receiving the substitute request from another device (when a result of step S35 is YES), the information processing device 3 sends the received response to the sender of the substitute request (step S36), then registers the substitute information received from another device with the substitute management information 30 (step S37). The information processing device 3 is allowed to register the information relating to the periodic communication that should be established by another device with the substitute management information 30 so that it is allowed to establish the periodic communication for another device. When not receiving the substitute request from another device (when a result of step S35 is NO), the information processing device 3 skips the processes in steps S36 and S37.

The information processing device 3 determines if the substitute notice is received from another device (step S38). When receiving the substitute notice from another device (when a result of step S38 is YES), the information processing device 3 sends the wake-up notice to another device which is the sender of the substitute notice (step S39), then obtains the substitute management information 30 from another device (step S40). The information processing device 3 then performs a substitute cancelation determination (step S41). In the substitute cancelation determination, it is determined whether or not another device is back to normal mode from sleep mode for the periodic communication with the server 7. Another device may be back to normal mode from sleep mode for the periodic communication with the server 7. In this case, the information processing device 3 determines to cancel to establish the periodic communication for another device. The information processing device 3 determines whether or not to cancel to establish the periodic communication for another device with the result of the substitute cancelation determination (step S42). For canceling to establish the periodic communication for another device (when a result of step S42 is YES), the information processing device 3 sends the substitute cancelation to another device (step S43). The information processing device 3 then generates the substitute information (step S44), and broadcasts the substitute cancelation to another device (step S45).

Through the above-described process in the routine process (step S12), the information processing device 3 in normal mode is allowed to establish the periodic communications at the certain time interval with the server 7. The information processing device 3 is also allowed to receive the substitute request for the periodic communication from another device and/or to change the periodic communication established by another device for even another device to be established by the information processing device 3. Besides the above-described process, in the routine process (step S12), the process to register the substitute information with the substitute management information 30 may also be performed when the substitute information broadcasted from another device, for instance, is received.

Referring back to the flow diagram of FIG. 17, the condition to enter sleep mode may be met (when a result of step S13 is YES) as the above-described routine process (step S12) is repeatedly performed. The information processing device 3 checks that there is another device connecting to the same server 7 (step S14). The information processing device 3 makes the inquiry at the server 7 about another device establishing the session in the same local network 5, for example, thereby checking if there is another device connecting to the same server 7. If there is another device (when a result of step S15 is YES), the information processing device 3 performs the substitute device determination (step S16).

FIG. 19 is a flow diagram explaining an exemplary sequential procedure of the substitute device determination (step S16) in detail. Upon start of the substitute device determination, the information processing device 3 performs the left time check (step S50). To be more specific, the information processing device 3 sends the left time request to another device. The information processing device 3 determines whether or not the left time response is received from another device (step S51). When the left time response is received from another device (when a result of step S51 is YES), the information processing device 3 determines the device that has the longest left time as the substitute device (step S52).

When the left time response is not received from another device within a predetermined period of time, the information processing device 3 is allowed to find that another device is in sleep mode. If the left time response is not received from another device within the predetermined period of time (when a result of step S51 is NO), the information processing device 3 refers to the substitute management information 30, for example, thereby determining that there is the device that also connecting to another server 7 of the other devices connecting to the server 7 the same as which the information processing device 3 is connecting to (step S53). There may be the device that also connecting to another server 7 (when a result of step S53 is YES). In this case, the information processing device 3 determines the device also connecting to another server 7 as the substitute device (step S54). There may not be the device that also connecting to another server 7 (when a result of step S53 is NO). In this case, the information processing device 3 does not request another device to establish the periodic communication for it. The information processing device 3 determines to establish the periodic communication by itself (step S55). The substitute device determination is thus complete.

Referring back to the flow diagram of FIG. 17, the information processing device 3 determines whether or not it is determined to request another device to establish the periodic communication for it (step S17) through the above-described substitute device determination (step S16). For requesting another device (when a result of step S17 is YES), the information processing device 3 sends the substitute request to another device determined as the substitute device (step S18). By receiving the received notice from another device, the information processing device 3 generates the substitute information (step S19), and broadcasts the substitute information to another device (step S20). As described above, the process to request another device to establish the periodic communication for it soon before entering sleep mode is thus complete.

If there is no other device connecting to the same server 7 (when a result of step S15 is NO), or if it is determined that the substitute request to another device is not sent in the substitute device determination (when a result of step S17 is NO), the information processing device 3 sets the wake-up timing to be back to normal mode to establish the next periodic communication with the server 7 with the power controller 23 before entering sleep mode (step S21). The information processing device 3 then enters sleep mode from normal mode (step S22).

As described above, the information processing device 3 of the first preferred embodiment requests another device installed on the same local network 5 to establish the periodic communication with the server 7 that should be established by the periodic communicating part 35 when the power controller 23 enables the information processing device 3 to enter sleep mode from normal mode. After entering sleep mode, the information processing device 3 is not required to be back to normal mode at the certain time intervals for the periodic communications with the server 7, resulting in increase in duration of sleep mode. Hence, the information processing device 3 of the first preferred embodiment is capable of obtaining the better power-saving effect than in the past.

As described above, the connection with the server is effectively maintained at the information processing device, and a better power-saving effect than before can be obtained at the same time.

(Second Preferred Embodiment)

The second preferred embodiment of the present invention is explained next. In the above-described first preferred embodiment, the information processing device 3 determines the substitute device that establishes the periodic communication with the server 7 for it. In the second preferred embodiment, the server 7 determines the substitute device. The configurations of the information processing system 1 and the information processing device 3 of the second preferred embodiment are the same as the first preferred embodiment.

Figure 20:
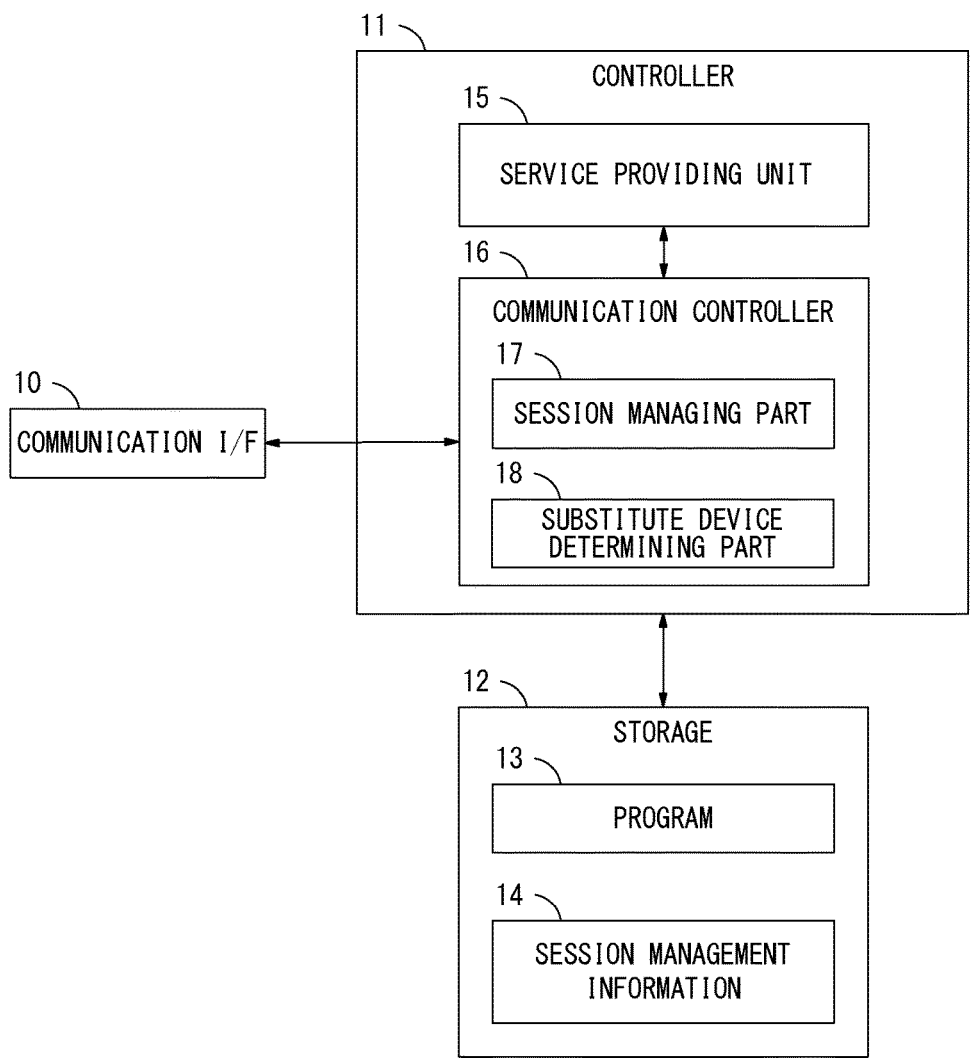
FIG. 20 is a block diagram showing an example of a hardware structure and that of a functional structure of the server of the second preferred embodiment.

FIG. 20 is a block diagram showing an example of a hardware structure and that of a functional structure of the server 7 of the second preferred embodiment. As illustrated in FIG. 20, the difference between the server 7 of the first preferred embodiment and the second preferred embodiment is that the communication controller 16 of the second preferred embodiment includes a substitute device determining part 18 besides the session managing part 17.

When the inquiry about the substitute device that establishes the periodic communication for another device is received from the single information processing device 3, the substitute device determining part 18 determines the substitute device from among the other information processing devices 3 except for the single information processing device 3, and notifies the single information processing device 3 that has made the inquiry of the substitute device of the substitute device. To be more specific, in response to receiving the inquiry about the substitute device from the information processing device 3 in the local network 5, the substitute device determining part 18 refers to the session management information 14. The server 7 may be establishing the session with another device in the same local network 5. In this case, another device is extracted as an alternative substitute device. If there is only one device that is extracted as the alternative substitute device, the substitute device determining part 18 determines the device as the substitute device, and sends a response to the information processing device 3 that has made the inquiry.

Multiple devices may be extracted as the alternative substitute devices. In such a case, the substitute device determining part 18 determines one of the multiple devices as the substitute device. The substitute device determining part 18 may refer to the periodic communication history 14c of the session management information 14, for example, thereby determining the device that has the shortest elapsed time from the previous periodic communication as the substitute device. More specifically, the device that has the shortest elapsed time from the previous periodic communication is more likely to be in normal mode. The device may be set as the substitute device while it is in normal mode. Alternatively, it is assumed that the substitute device determining part 18 has received the periodic communication from the device different from the information processing device 3 which is registered with the communication partner information 14b of the session management information 14, for example. In this case, the substitute device determining part 18 may determine that the partner device of the periodic communication has already served as the substitute for another device to establish the periodic communication for another device, and may determine the partner device as the substitute device. It is more preferable because the authorities to serve as the substitute can be gathered to the single information processing device 3. The substitute device determining part 18 sends the response about the substitute device to the information processing device 3 that has made the inquiry.

FIG. 21 is a flow diagram explaining an exemplary procedure of an operation when the information processing device 3a of the second preferred embodiment enters sleep mode. The predetermined condition to enter sleep mode may be met at the information processing device 3a. In this case, the information processing device 3a starts the sleep mode entering process (process P110). The sleep mode entering process is performed by the substitute requesting part 36. Upon the start of the sleep mode entering process, the substitute requesting part 36 performs the substitute device determination at first (process P111). After the connecting device check is performed by the substitute requesting part 36, the inquiry about the substitute device is sent to the server 7a from the information processing device 3a (process P112). In response to receiving the inquiry about the substitute device, the server 7a performs the substitute device determination as described above (process P113). As a result, one of the information processing devices 3b and 3c that are currently establishing the sessions with the server 7a is determined as the substitute device. In the example of the second preferred embodiment, the information processing device 3b is determined as the substitute device.

After the information processing device 3b is determined as the substitute device, the server 7a sends the substitute device response to the information processing device 3a (process P114). In response to receiving the substitute device response from the server 7a, the information processing device 3a is allowed to determine the substitute device with the received response. The information processing device 3a then starts the substitute request to send the request to the information processing device 3b (process P115). The processes after process P115 are the same as those after process P18 in FIG. 7. The information processing device 3a of the second preferred embodiment is also capable of enabling another information processing device 3b to establish the periodic communication that should be established with the server 7a for it.

When the information processing device 3 enters sleep mode, it makes the inquiry about the substitute device at the server 7, and the server 7 determines the substitute device and gives the response to the information processing device 3 according to the second preferred embodiment. The information processing device 3 is not required to check the time left until another device enters sleep mode. The process to request another device to send the substitute request may be performed effectively.

Everything else explained in the second preferred embodiment is the same as the first preferred embodiment.

Although the present invention has been described and illustrated in detail, it is clearly understood that the same is by way of illustrated and example only and is not to be taken by way limitation, the scope of the present invention being interpreted by terms of the appended claims.

(Modifications)

While the preferred embodiments of the present invention have been described above, the present invention is not limited to the preferred embodiments. Various modifications may be applied to the present invention.

In the above-described first and second preferred embodiments, the server 7 is installed on Internet 6. However, this is given not for limitation. More specifically, the server 7 is not necessarily installed on Internet 6. The server 7 may be installed in a network environment something different from the local network 5 in which the multiple information processing devices 3a, 3b and 3c are installed.

In the above-described first and second preferred embodiments, the information processing device 3 is constructed by the device such as one of MFPs, for instance, which is capable of executing the job by working together with the server 7. The information processing device of the present invention is not necessarily the device such as one of the MFPs. The information processing device 3 may be constructed by a device such as a gateway installed on the local network, for instance, capable of relaying the communications between the device such as one of the MFPs and the server 7.

In the above-described first and second preferred embodiments, For determining the substitute device, the information processing device 3 checks the time left until another device enters sleep mode. If the response about the left time cannot be received from another device, the information processing device 3 performs the process to check whether or not another device has established the session also with another server. However, this is given not for limitation. The information processing device 3 may determine another device that has established the session also with another server as the substitute device by putting it override the left time. It is assumed that the information processing device 3a determines the substitute device, for example. In this case, the information processing device 3a makes an inquiry to each of the other information processing devices 3b and 3c that is establishing the session with the same server 7a whether or not it is establishing the session also with another server different from the server 7a. The information processing device 3a may determine the information processing device 3c that is establishing the session also with another server 7b as the substitute device based on the responses from the other information processing devices 3b and 3c. The authorities to serve as the substitute can be gathered to the information processing device 3c that is establishing the sessions with the servers 7a and 7b. As a result, the number of the information processing device 3 that is back to normal mode from sleep mode on the periodical basis for the periodic communications in the local environment 2 may be be kept to the minimum.

What is claimed is:
1. An information processing device that communicates with a server on Internet over a local network, comprising:
a hardware processor that is configured to:
  establish a session that enables a communication with said server over said local network;

establish periodic communications at a predetermined time interval with said server to maintain said session; and wherein (1) when multiple other devices are installed on said local network that are establishing sessions that enable the periodic communications with said server, and (2) when the information processing device is going into sleep mode after a condition to enter the sleep mode is met, said hardware processor requests one of the multiple other devices that has the longest time left until entering the sleep mode to establish the periodic communications with said server for said information processing device as a substitute for said information processing device.

2. The information processing device according to claim 1, wherein the hardware processor is further configured to:
establish substitute periodic communications with said server that should be established by yet another of the multiple other devices for the another device when the one device on said local network requests to establish the periodic communication for it.

3. The information processing device according to claim 2, wherein
said hardware processor establishes the substitute periodic communications which are requested by the one of the multiple other devices at the same point in time when said information processing device establishes the periodic communications with said server.

4. The information processing device according to claim 2, wherein
said hardware processor requests the one device on said local network to establish both of the periodic communications established by said information processing device and the substitute periodic communications requested by the one of the multiple other devices when said hardware processor serves as a substitute to establish the periodic communications with said server and said information processing device goes into the sleep mode.

5. The information processing device according to claim 1, wherein
said hardware processor sends substitute information showing that the request to establish the periodic communications with said server for said information processing device that is sent to said one of the other multiple devices is also sent to at least another device that is establishing the session that enables the communications with said server after sending the request to be the substitute for said information processing device to establish the periodic communications with said server to said one of the other devices.

6. The information processing device according to claim 1, wherein
said hardware processor makes an inquiry about time left until entering the sleep mode at each of the multiple other devices that are establishing the sessions that enable the communications with said server, and selects one of the multiple other devices based on responses from the multiple other devices.

7. The information processing device according to claim 1, wherein
said hardware processor makes the inquiry at said server and requests the one device specified by said server to establish the periodic communication with said server for said information processing device when said information processing device goes into sleep mode.

8. The information processing device according to claim 1, further comprising:
a power controller that stops establishing periodic communications at a predetermined time interval with said server to maintain said session if a predetermined condition to enter sleep mode is met.

9. An information processing device that communicates with a server on Internet over a local network, comprising:
a hardware processor that is configured to:
establish a session that enables a communication with said server over said local network;
establish periodic communications at a predetermined time interval with said server to maintain said session; and
wherein (1) when multiple other devices are installed on said local network that are establishing sessions that enable the periodic communications with said server, and (2) when the information processing device is going into sleep mode after a condition to enter the sleep mode is met, said hardware processor requests another device of the multiple other devices that is establishing a session that enables communication with another server, which is different from said server, to establish the periodic communications with said server for said information processing device.

10. The information processing device according to claim 9, wherein
said hardware processor makes the inquiry whether or not each of the multiple other devices is establishing the session that enables the communication with another server, different from said server, at each of the multiple other devices establishing the session that enables the communication with said server, and selects one of the multiple other devices based on responses from the multiple other devices.

11. The information processing device according to claim 9, further comprising:
a power controller that stops establishing periodic communications at a predetermined time interval with said server to maintain said session if a predetermined condition to enter sleep mode is met.

12. An information processing system, comprising:
a first information processing device installed on a local network;
a server on Internet capable of communicating with said first information processing device over said local network, wherein
said first information processing device includes:
a first hardware processor configured to:
establish a first session that enables a communication with said server over said local network, and establishes periodic communications at a predetermined time interval with said server to maintain the first session; and
when the information processing system includes at least two other information processing devices on said local network, other than the first information processing device, and the at least two other information processing devices are each establishing a session that allows the communications with said server, said first hardware processor requests one of the more than two other information processing devices, that has a longest left time until going into sleep mode, for establishing the periodic communications with said server.

13. A server connected to Internet and capable of communicating with multiple information processing devices, comprising:

a hardware processor configured to:
establish a separate session with each of said multiple information processing devices, and maintain said session by receiving periodic communications from each of said information processing devices;
determine a substitute device that establishes the periodic communications for one of said multiple information processing devices from among the other multiple information processing devices that are establishing said sessions except for said one of said multiple information processing devices when an inquiry about the substitute device that establishes the periodic communications for said one of said multiple information processing devices is received from said one of said multiple information processing devices; and
manage history information relating to a history of communications with each of said information processing devices, wherein
said hardware processor determines a device that has a shortest elapsed time after the previous periodic communications as the substitute device based on said history information when there are multiple other information processing devices establishing said sessions.

14. A non-transitory recording medium storing a computer readable program to be executed by an information processing device that communicates with a server on Internet over a local network, execution of the computer readable program by said information processing device causing said information processing device to execute the steps of:
    (1) establishing a session with said server over said local network;
    (2) establishing periodic communications with said server at a predetermined time interval to maintain said session;
    (3) enabling a power state to enter sleep mode if a predetermined condition to enter sleep mode is met;
    (4) requesting another device on said local network to establish the periodic communications with said server that should be established in said step (2) when the power state is enabled to enter sleep mode in said step (3); and
    (5) when multiple other devices are installed on said local network that are establishing sessions that enable the periodic communications with said server, the another device that has the longest time left of the multiple other devices until entering the sleep mode to establish the periodic communications with said server for said information processing device as a substitute for said information processing device.

15. A non-transitory recording medium storing a computer readable program to be executed by a server connected to Internet and capable of communicating with multiple information processing devices, execution of the computer readable program by said server causing said server to execute the steps of:
    (1) establishing a separate session with each of said multiple information processing devices, and maintaining said session by receiving a periodic communication from each of said information processing devices; and
    (2) determining a substitute device that establishes the periodic communication for one of said multiple information processing devices from among other of the multiple information processing devices that are establishing said sessions, except for said one of said multiple information processing devices, when an inquiry about the device that establishes the periodic communication for said one of said multiple information processing devices is received from said one of said multiple information processing devices, and
    (3) managing history information relating to history of communications with said each information processing device, wherein, when there are multiple other information processing devices establishing said sessions, determining a device that has the shortest elapsed time after the previous periodic communication as the substitute device based on said history information.

16. An information processing system, comprising:
a first information processing device installed on a local network;
a server on Internet capable of communicating with said first information processing device over said local network, wherein
said first information processing device includes:
a first hardware processor configured to:
establish a first session that enables a communication with said server over said local network, and establishes periodic communications at a predetermined time interval with said server to maintain the first session; and
when the information processing system includes at least two other information processing devices on said local network that allow communication with said server, other than the first information processing device, said first hardware processor requests one of the at least two other information processing devices, that allows a communication with another server, that is different from said server, for establishing the periodic communications with said server.

17. A non-transitory recording medium storing a computer readable program to be executed by an information processing device that communicates with a server on Internet over a local network, execution of the computer readable program by said information processing device causing said information processing device to execute the steps of:
establishing a session that enables a communication with said server over said local network;
establishing periodic communications at a predetermined time interval with said server to maintain said session; and
when there are multiple devices that are establishing sessions that enable communications with said server, requesting one of the multiple other devices, that allows a communication with another server, that is different from said server, for establishing the periodic communications with said server that should be established by said periodic communicating part for said periodic communicating part when going into sleep mode after a condition to enter the sleep mode is met.

* * * * *